(12) United States Patent
Kuwatsuka et al.

(10) Patent No.: US 10,995,382 B2
(45) Date of Patent: *May 4, 2021

(54) PRODUCTION METHOD FOR STABILIZERS

(71) Applicant: NHK SPRING CO., LTD., Kanagawa (JP)

(72) Inventors: Shinichiro Kuwatsuka, Kanagawa (JP); Yurika Okudaira, Kanagawa (JP); Akira Tange, Kanagawa (JP); Hideki Okada, Kanagawa (JP); Ken Takahashi, Kanagawa (JP)

(73) Assignee: NHK SPRING CO., LTD., Yokohama (JP)

( * ) Notice: Subject to any disclaimer, the term of this patent is extended or adjusted under 35 U.S.C. 154(b) by 651 days.

This patent is subject to a terminal disclaimer.

(21) Appl. No.: 15/534,470

(22) PCT Filed: Dec. 7, 2015

(86) PCT No.: PCT/JP2015/084330
§ 371 (c)(1),
(2) Date: Jun. 8, 2017

(87) PCT Pub. No.: WO2016/093199
PCT Pub. Date: Jun. 16, 2016

(65) Prior Publication Data
US 2017/0349961 A1    Dec. 7, 2017

(30) Foreign Application Priority Data
Dec. 8, 2014  (JP) .............................. JP2014-248409

(51) Int. Cl.
*C21D 9/00* (2006.01)
*B21D 53/88* (2006.01)
(Continued)

(52) U.S. Cl.
CPC .......... *C21D 9/0068* (2013.01); *B21D 47/00* (2013.01); *B21D 53/88* (2013.01); *B24C 1/10* (2013.01);
(Continued)

(58) Field of Classification Search
CPC ......... B21D 47/00; B21D 53/88; B24C 11/00; B24C 1/10; B24C 3/32; B60G 21/055;
(Continued)

(56) References Cited

U.S. PATENT DOCUMENTS

| 4,526,628 A | 7/1985 | Ohno |
| 2005/0029722 A1 | 2/2005 | Reichel |

(Continued)

FOREIGN PATENT DOCUMENTS

| CN | 1564759 | 1/2005 |
| CN | 102317493 | 1/2012 |

(Continued)

OTHER PUBLICATIONS

Notification of Reason for Refusal dated Apr. 29, 2019 for corresponding Korean application No. 10-2017-7018140.
(Continued)

*Primary Examiner* — Jenny R Wu
(74) *Attorney, Agent, or Firm* — Martin & Ferraro, LLP

(57) ABSTRACT

The invention provides a production method for stabilizers which produces with high productivity in a compact production line, without tempering. The production method for stabilizers of the invention includes: forming a steel bar material containing at least C: 0.15 wt % to 0.39 wt %, Mn, B and Fe into a product shape by bending; and quenching the bent steel bar material in a medium having a heat transfer coefficient higher than or close to that of water.

6 Claims, 13 Drawing Sheets

(51) Int. Cl.

| | | |
|---|---|---|
| B24C 1/10 | (2006.01) | |
| C21D 1/60 | (2006.01) | |
| C21D 6/00 | (2006.01) | |
| B21D 47/00 | (2006.01) | |
| C21D 8/06 | (2006.01) | |
| C22C 38/00 | (2006.01) | |
| C22C 38/54 | (2006.01) | |
| C22C 38/44 | (2006.01) | |
| C22C 38/42 | (2006.01) | |
| C22C 38/04 | (2006.01) | |
| C22C 38/02 | (2006.01) | |
| C21D 7/06 | (2006.01) | |
| F16F 1/02 | (2006.01) | |
| F16F 1/14 | (2006.01) | |
| B60G 21/055 | (2006.01) | |
| C22C 38/60 | (2006.01) | |
| C21D 9/02 | (2006.01) | |
| C21D 9/08 | (2006.01) | |

(52) U.S. Cl.
CPC ............ *B60G 21/055* (2013.01); *C21D 1/60* (2013.01); *C21D 6/00* (2013.01); *C21D 6/004* (2013.01); *C21D 6/005* (2013.01); *C21D 6/008* (2013.01); *C21D 7/06* (2013.01); *C21D 8/06* (2013.01); *C21D 8/065* (2013.01); *C21D 9/00* (2013.01); *C21D 9/0075* (2013.01); *C21D 9/02* (2013.01); *C21D 9/08* (2013.01); *C22C 38/00* (2013.01); *C22C 38/002* (2013.01); *C22C 38/02* (2013.01); *C22C 38/04* (2013.01); *C22C 38/42* (2013.01); *C22C 38/44* (2013.01); *C22C 38/54* (2013.01); *C22C 38/60* (2013.01); *F16F 1/02* (2013.01); *F16F 1/14* (2013.01); *B60G 2206/724* (2013.01); *B60G 2206/8103* (2013.01); *B60G 2206/8402* (2013.01); *B60G 2206/8403* (2013.01); *C21D 2211/008* (2013.01); *F16F 1/021* (2013.01); *F16F 2224/0208* (2013.01); *F16F 2226/00* (2013.01)

(58) Field of Classification Search
CPC ........ B60G 2202/135; B60G 2206/427; B60G 2206/72; B60G 2206/724; B60G 2206/8103; B60G 2206/81035; B60G 2206/81062; B60G 2206/8402; B60G 2206/8403; C21D 1/60; C21D 2211/008; C21D 6/00; C21D 6/004; C21D 6/005; C21D 6/008; C21D 7/06; C21D 8/06; C21D 8/065; C21D 9/00; C21D 9/0068; C21D 9/0075; C21D 9/02; C21D 9/08; C22C 38/00; C22C 38/001; C22C 38/002; C22C 38/02; C22C 38/04; C22C 38/18; C22C 38/22; C22C 38/24; C22C 38/26; C22C 38/28; C22C 38/32; C22C 38/40; C22C 38/42; C22C 38/44; C22C 38/46; C22C 38/48; C22C 38/50; C22C 38/54; C22C 38/60; F16F 1/02; F16F 1/021; F16F 1/14; F16F 2224/0208; F16F 2226/00

See application file for complete search history.

(56) References Cited

U.S. PATENT DOCUMENTS

| | | | |
|---|---|---|---|
| 2006/0243355 A1* | 11/2006 | Haiderer | C21D 9/02 148/593 |
| 2011/0290382 A1 | 12/2011 | Kikuchi et al. | |
| 2012/0318409 A1* | 12/2012 | Mizuno | C21D 9/0068 148/506 |
| 2013/0093153 A1* | 4/2013 | Ito | B05D 5/00 280/124.107 |
| 2013/0118649 A1* | 5/2013 | Hirata | B05D 3/0218 148/537 |
| 2014/0060709 A1 | 3/2014 | Tange et al. | |
| 2017/0021691 A1 | 1/2017 | Tange et al. | |
| 2017/0130288 A1 | 5/2017 | Fukuoka et al. | |
| 2017/0174030 A1 | 6/2017 | Mori | |

FOREIGN PATENT DOCUMENTS

| | | | |
|---|---|---|---|
| CN | 102782172 | | 11/2012 |
| CN | 103518000 | | 1/2014 |
| EP | 1 905 857 | A2 | 4/2008 |
| EP | 3 124 638 | A1 | 2/2017 |
| JP | 01004424 | A * | 1/1989 |
| JP | H11-323495 | A | 11/1999 |
| JP | 2000-017390 | A | 1/2000 |
| JP | 2005-002365 | A | 1/2005 |
| JP | 2006-089785 | A | 4/2006 |
| JP | 2006089783 | A * | 4/2006 |
| JP | 2006089785 | A * | 4/2006 |
| JP | 2007-217736 | A | 8/2007 |
| JP | 2009-072806 | A | 4/2009 |
| JP | 4406341 | B2 | 1/2010 |
| JP | 2010-185109 | A | 8/2010 |
| JP | 2011-189892 | A | 9/2011 |
| JP | 2011-196491 | A | 10/2011 |
| JP | 2012-237040 | A | 12/2012 |
| KR | 10-2013-0140182 | | 12/2013 |
| WO | WO2011/111623 | A | 6/2011 |

OTHER PUBLICATIONS

European Search Report dated Jun. 15, 2018 for application No. EP1586756.
Olivier Rod: "Opportunities and dangers of using residual elements in steels: a literature survey", Dec. 7, 2006 (Dec. 7, 2006), XP055468670, United States; ISBN: 978-92-1-116634-7; Retrieved from the internet: URL: http://www.jernkontoret.se/globalassets/publicerat/forskning/d-rapporter/d819.pdf [retrieved on Apr. 19, 2018].
Michael F. Ashby; Chapter 13—Steels 2 Alloy Steels; Engineering Materials 2 (Fourth Edition) 2013 pp. 221-226 (Year: 2013).
AISI 1021 Chemical Compositions, AISI 1021 Mechanical Properties, AISI 1021 Heat Treatment.
Notice of Final Rejection dated Nov. 26, 2019 for corresponding Korean Application No. 10-2017-7018140; and English translation.
1st Office Action on JP2014-248409 dated Dec. 18, 2015, Japanese Patent Office, 3 pgs.
2nd Office Action on JP2014-248409 dated Jul. 22, 2016, Japanese Patent Office, 4 pgs.

\* cited by examiner

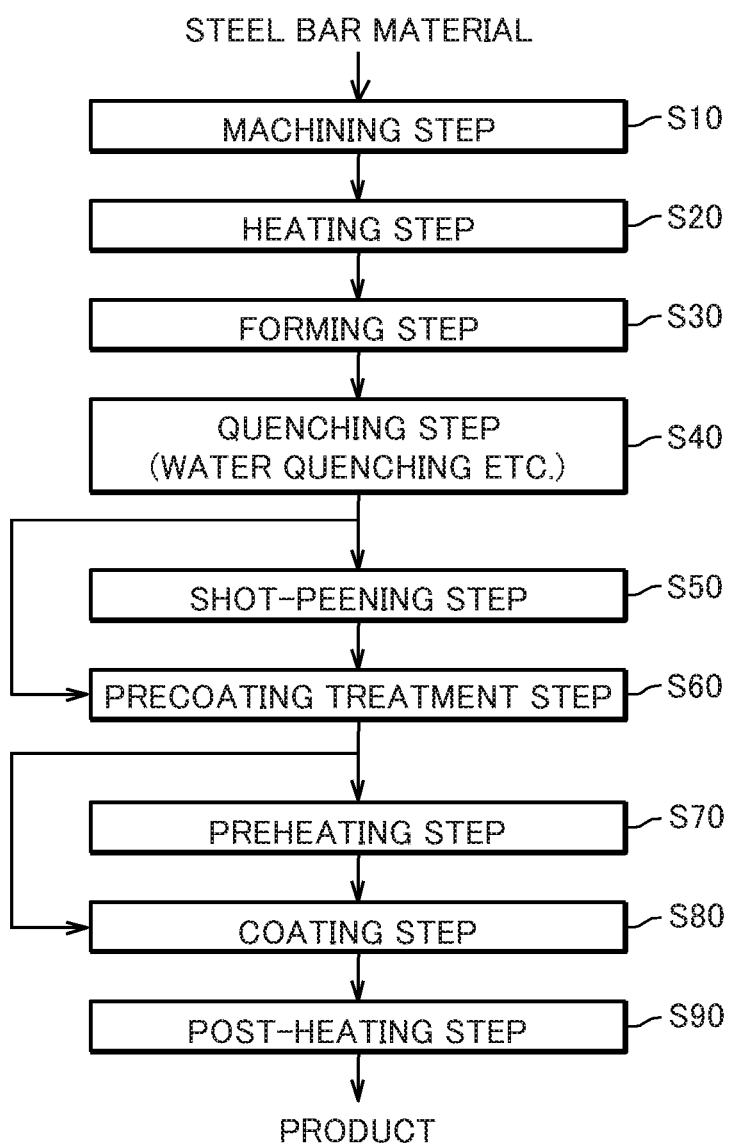

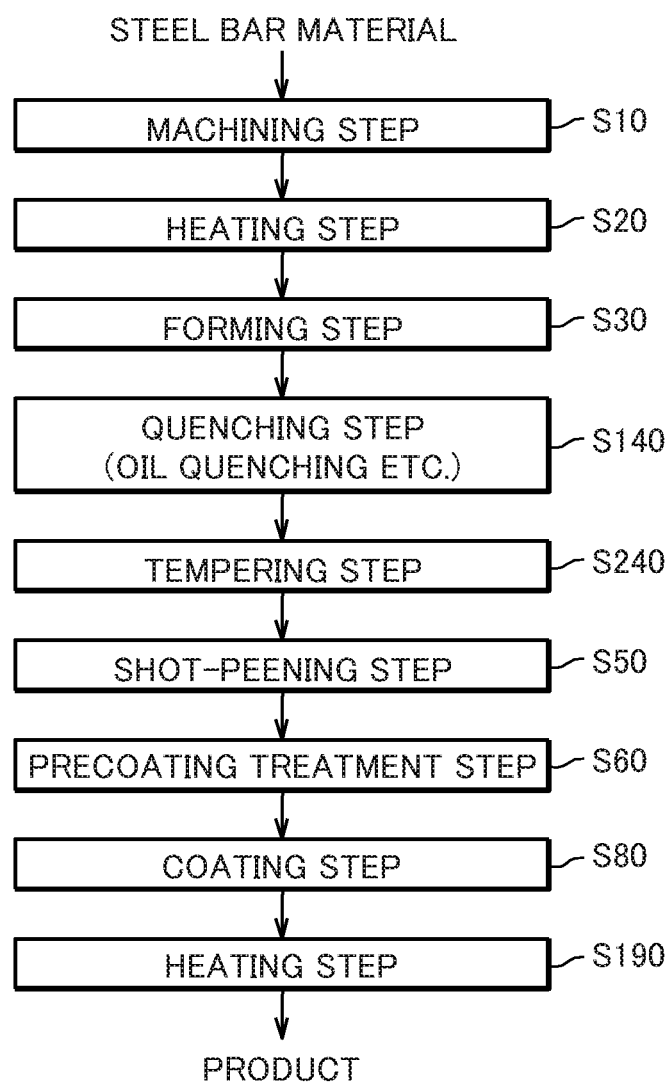

PRODUCTION METHOD FOR STABILIZERS

This is a National Phase Application under 35 USC 371 of PCT/JP2015/084330 filed Dec. 7, 2015 (published on Jun. 16, 2016 as WO 2016/093199); which claims priority to Japanese Application No. 2014-248409 filed Dec. 8, 2014; all of which are incorporated by reference herein in their entirety.

TECHNICAL FIELD

The invention relates to a production method for stabilizers.

BACKGROUND ART

A vehicle such as an automobile is provided with stabilizers (stabilizer bars or anti-roll bars) which suppress roll of a vehicle body due to vertical displacement of wheels. The stabilizer is generally a bar in a substantial U-shape and includes a torsion portion extending in a lateral direction and a pair of right and left arm portions which are bent in a longitudinal direction of the vehicle. In the vehicle, the distal ends of the arm portions in the stabilizer are coupled to respective suspensions and the torsion portion is inserted into bushings fixed on the vehicle body, to support the stabilizer in a suspended manner between the right and left suspensions.

When the vehicle that is traveling makes a turn or travels on an undulating road, a stroke difference occurs between the right and left suspensions due to the vertical displacement of the right and left wheels. In this case, each arm portion of the stabilizer receives a load (displacement) caused by the stroke difference between the suspensions, which distorts the torsion portion by the load (displacement difference) from each arm portion. The torsion portion generates elastic force to recover the distorted deformation. The stabilizer increases roll stiffness of the vehicle body to suppress the vertical displacement difference between the right and left wheels by the elastic force for recovering the distorted deformation, which suppresses the roll of the vehicle body.

There are two configurations of the stabilizer, that is, a hollow stabilizer having a hollow structure, and a solid structure having a solid structure. The hollow stabilizer contributes to weight reduction of the vehicle body, but its manufacturing cost is relatively high because a raw material is used such as an electric resistance welded steel pipe or a solid-drawn steel pipe. In contrast, the solid stabilizer is superior in a mechanical strength and a manufacturing cost.

Conventionally, the stabilizer is generally made of a carbon steel such as S48C (JIS standard) or a spring steel such as SUP9 (JIS standard) and SUP9A (JIS standard) which has a good mechanical strength such as a tensile strength and a good fatigue resistance. The solid stabilizer is often produced by heating or cooling to be bent for forming a hot rolled steel bar or a cold rolled steel bar made of the material described above in a product shape, and then by heating the bent workpiece. The heating process includes quenching and tempering. Oil quenching is frequently used as quenching. A semi-finished product of the stabilizer after the heating process is usually subjected to a surface treatment by shot-peening and a finishing process such as coating to be a final product.

As an example of a production line to produce a stabilizer through the oil quenching and tempering, for example, Patent Document 1 discloses a stabilizer bar production line including a heating furnace for heating a spring steel wire, a stabilizer bar producing device for bending the spring steel wire heated in the heating furnace to produce a stabilizer bar, a quenching tank for quenching the produced stabilizer bar in quenching oil, a cleaning device for cleaning the quenched stabilizer bar, and a tempering furnace for tempering the cleaned stabilizer bar (see paragraphs 0021, 0022, etc.).

PRIOR ART DOCUMENT

Patent Document

Patent Document 1: Japanese Patent Application Publication No. 2009-072806

SUMMARY OF THE INVENTION

Problems to be Solved

It is especially important for a stabilizer to have a good shock resistance and fatigue durability among required properties, and a stabilizer is desired to have both a superior mechanical strength and a fracture toughness. Then, in the conventional production method for stabilizers, a spring steel material having a good mechanical strength and a fatigue resistance is used as a material to improve a fracture toughness by tempering after quenching, allowing the stabilizer to have both a good mechanical strength and a fracture toughness. Further, conventional tempering is regarded as an important step for preventing season cracking.

However, for tempering in the stabilizer production, as disclosed in Patent Document 1, an elongated tempering furnace needs to be provided in a production line and a stabilizer needs to be in an additional long heating process after quenching. In recent years, stabilizers are desired to be produced in a vicinity of a vehicle manufacturer strategically newly locating or moving production bases. Accordingly, a compact-sized production line for stabilizers is strongly desired. Thus, it has become a major burden in terms of cost as well as space to install a conventional elongated tempering furnace in making a new production line. Therefore, a production line having a conventional elongated tempering furnace is contrary to the recent demand, so that improvement is desired. As described above, the conventional production line for stabilizers greatly reduces productivity, increases a cost in view of facility scale, man-hours, an operating cost and the like, and disturbs to reduce production steps.

Further, in the conventional production method for stabilizers, as disclosed in Patent Document 1, oil quenching is used as quenching. A spring steel used as a conventional material does not always have a sufficient quenching effect, and distortion and quench cracking may occur if a cooling rate is too fast. However, a cooling agent such as mineral oil used in oil quenching may include a risk of ignition, so that the cooling agent is restricted on facility design, handling, storage and the like for security reasons. In addition, an environmental impact of waste oil is not negligible, which requires high waste cost and results in one of factors impairing production efficiency of the stabilizer.

Accordingly, the invention provides a production method for stabilizers which produces stabilizers having a good mechanical strength and a fracture toughness with high productivity in a compact-sized production line.

Solution to Problems

To solve such problems, firstly, the invention provides a production method for stabilizers having steps of: forming a steel bar material containing at least C: 0.15 wt % to 0.39 wt %, Mn, B and Fe into a product shape by bending; and quenching the bent steel bar material in a medium having a heat transfer coefficient higher than or close to that of water, wherein a stabilizer is produced of the quenched steel bar material without being tempered.

Secondly, the invention provides a production method for stabilizers having steps of: forming a steel bar material containing at least C: 0.15 wt % to 0.39 wt %, Mn, B and Fe into a product shape by bending; and quenching the bent steel bar material at a lower critical cooling rate or above after austenitizing, wherein a stabilizer is produced of the quenched steel bar material without being tempered.

Advantageous Effects of the Invention

The invention provides a production method for stabilizers which produces stabilizers having a good mechanical strength and a fracture toughness with high productivity in a compact-sized production line.

BRIEF DESCRIPTION OF THE DRAWINGS

FIG. 2 is a flow chart illustrating steps of a production method for stabilizers according to the embodiment of the invention;

FIG. 3 is a flow chart illustrating steps of a production method for stabilizers of a comparative example;

FIGS. 4A and 4B are conceptual diagrams illustrating a mechanism of a residual stress generation caused by a thermal stress, in which FIG. 4A is a diagram illustrating a deformation process caused by cooling and FIG. 4B is a diagram illustrating the residual stress after plastic deformation;

FIGS. 5A and 5B are conceptual diagrams illustrating mechanism of residual stress generation caused by a transformation stress, in which FIG. 5A is a diagram illustrating a deformation process caused by martensitic transformation and FIG. 5B is a diagram illustrating the residual stress after plastic deformation;

FIGS. 9A and 9B are graphs illustrating measurement results of a surface residual stress in the stabilizer produced without shot-peening, in which FIG. 9A is a graph illustrating results of the stabilizer according to the embodiment and FIG. 9B is a graph illustrating results of the stabilizer according to the comparative example;

FIGS. 10A and 10B are graphs illustrating measurement results of a surface residual stress in the stabilizer produced with shot-peening, in which FIG. 10A is a graph illustrating results of the stabilizer according to the embodiment and FIG. 10B is a graph illustrating results of the stabilizer according to the comparative example;

FIGS. 11A and 11B are graphs illustrating analyzed results of the surface residual stress in the stabilizer according to the embodiment, in which FIG. 11A is a graph illustrating a relationship between the surface residual stress and the carbon contents of the steel material and FIG. 11B is a graph illustrating a relationship between the surface residual stress and diameters of the steel materials;

EMBODIMENTS OF THE INVENTION

Figure 1:
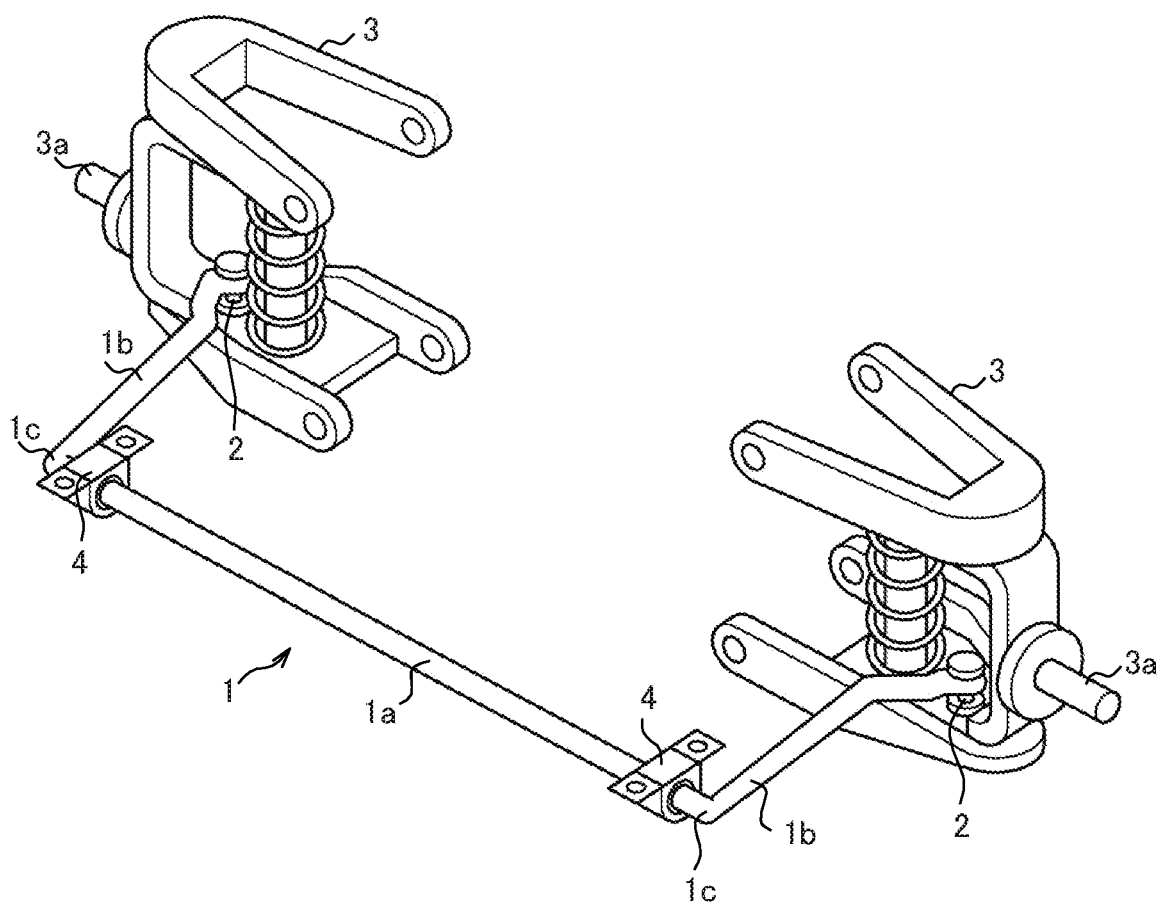
FIG. 1 is a perspective view exemplifying a stabilizer produced with a production method for stabilizers according to an embodiment of the invention.

Hereinafter, a description will be given of a production method for stabilizers according to an embodiment of the invention. Note that component elements common in respective drawings will be given the same reference numerals and redundant description will be omitted.

The production method for stabilizers according to the embodiment is directed to a vehicle stabilizer (stabilizer bar or anti-roll bar) which suppresses vehicle body roll and which is a solid stabilizer having a solid structure. The production method particularly includes steps of: forming a steel bar material bored or the like in a given shape into a product shape by bending; and quenching the bent steel bar material in a medium having a heat transfer coefficient higher than or close to that of water, wherein a stabilizer is produced of the quenched steel bar material without being tempered.

The production method for stabilizers according to the embodiment has remarkable features in that, as a heating process for the steel material, quenching is applied with the medium having a heat transfer coefficient higher than or close to that of water, and tempering is not applied after quenching. The method further has a feature in that a manganese boron steel having a low carbon content is used as a material for a stabilizer, to produce a stabilizer having good mechanical strength and fracture toughness as well as good shock resistance and fracture toughness.

First, a description will be given of a stabilizer produced with the production method for stabilizers according to the embodiment.

FIG. 1 is a perspective view exemplifying a stabilizer produced with the production method for stabilizers according to the embodiment of the invention.

As illustrated in FIG. 1, a stabilizer 1 produced with the production method for stabilizers according to the embodiment includes a torsion portion 1a extending in a lateral direction and a pair of right and left arm portions 1b, 1b extending in a longitudinal direction of the vehicle. A bar of the stabilizer 1 having the torsion portion 1a and the arm portions 1b, 1b is bent at bent portions 1c, 1c symmetrically arranged in the lateral direction, and forms a substantial U-shape by the torsion portion 1a, the right and left pair of arm portions 1b, 1b and the bent portions 1c, 1c.

Each arm portion 1b is formed with a flat coupling portion (eye portion) having a mounting hole by forging or the like at its distal end. The coupling portions are coupled via stabilizer links 2, 2 to a pair of right and left suspensions 3, 3 provided in the vehicle, respectively. Note that a wheel (not shown) is attached on an axle 3a of each suspension 3. Further, the torsion portion 1a is inserted through bushings 4 fixed to a cross member or the like (not shown) to be suspended between the right and left suspensions 3, 3. Accordingly, when a stroke difference occurs between the right and left suspensions 3, 3 due to vertical displacement of the right and left wheels, each arm 1b, 1b receives a load caused by displacement from each suspension 3, 3, the torsion portion 1a is torsionally deformed, and the torsion portion 1a generates elastic force for recovering the torsional deformation. The stabilizer 1 increases roll stiffness of the vehicle body by the elastic force against the torsional deformation to stabilize traveling of the vehicle.

The bar of the stabilizer 1 having the torsion portion 1a and the arm portions 1b, 1b is produced of a bar steel in a solid structure as a raw material. In the production method for stabilizers according to the embodiment, in particular, a manganese boron steel (Mn—B steel) having a low carbon content is used as a raw material for the bar steel. Specifically, a manganese boron steel material having a low carbon content containing at least carbon (C): 0.15 wt % to 0.39 wt %, manganese (Mn), boron (B) and iron (Fe) is used as a workpiece which is a steel bar produced by hot rolling or cold rolling as a raw material for the stabilizer 1. As described later in detail, the carbon content is determined based on a hardness, a fatigue strength, a fracture toughness and the like of the stabilizer 1 to be produced. Mn and B are selected for securing a quenching effect (strength).

Preferably, the steel bar produced of a manganese boron steel having a low carbon content particularly contains C: 0.15% to 0.39%, Si: 0.05% to 0.40%, Mn: 0.50% to 1.70%, B: 0.0005% to 0.003% in wt % as essential elements, P: 0.040% or lower and S: 0.040% or lower, and may contain at least one element selected from a group consisting of Ni, Cr, Cu, Mo, V, Ti, Nb, Al, N, Ca and Pb as an optional additive element in a range of 1.20% or lower, and contains a remainder having a chemical composition consisting of Fe and inevitably included impurity elements. Specifically, a steel equivalent to 15B23 or 15B26 in Standard American Engineering is preferably used.

In general, a manganese boron steel is regarded as a material having a good quenching effect and a mechanical strength. The production method for stabilizers according to the embodiment uses a manganese boron steel having a low carbon content. Accordingly, a stabilizer having a high standard tensile strength, a hardness, fracture impact values, a fracture toughness and the like is produced. In addition, a remained compressive residual stress and a fracture toughness of the stabilizer 1 prevent or suppress quench cracking and prevent season cracking, and a formation of a single phase martensite texture suppresses a formation of a local cell to improve a corrosion resistance.

The steel bar material made of a manganese boron steel having a low carbon content may have a chemical composition consisting of essential elements (C, Si, Mn, B), P and S regarded as inevitably included impurity elements, Fe and other inevitably included impurity elements forming the remainder, or a chemical composition containing an optional additive element besides the elements above. One or some of elements among Ni, Cr, Cu, Mo, V, Ti, Nb, Al, N, Ca and Pb as optional additive elements may be contained. A content of the optional additive element is in a range of 1.20 wt % or lower per added element.

If a steel bar material as a raw material for the stabilizer 1 has a chemical composition without any optional additive elements, since the steel bar having a good quenching effect is obtained with an inexpensive material cost, it is possible to produce the stabilizer 1 having both a strength and a fracture toughness with high productivity. On the other hand, if a steel bar has a chemical composition with optional additive elements, properties of the steel bar material is modified based on an element type. The chemical composition containing optional additive elements contains the essential elements, the optional additive elements, P and S which are inevitably included impurity elements, and the remainder containing Fe and other inevitably included impurity elements. A description will be given of each component element of the steel bar material as a raw material for the stabilizer 1.

Carbon (C) is a component element contributing to an improved mechanical strength and a hardness. Containing C of 0.15 wt % or higher can secure a good mechanical strength and a hardness, to have a quenching hardness superior to that of a conventional spring steel. Further, containing C of 0.39 wt % or lower can secure a mechanical strength and a given fracture toughness after quenching. Still further, quench cracking due to a transformation stress or the like and season cracking due to residual austenite are prevented and deterioration in corrosion resistance due to precipitation of carbides is suppressed. The content of C is preferably between 0.18 wt % and 0.35 wt %, and more preferably between 0.20 wt % and 0.26 wt %. Thus, the properties of the stabilizer 1 described above is further improved.

Silicon (Si) is a component element contributing to an improved mechanical strength and a hardness, as well as an additive component element for the purpose of deoxidation in a steel making process. Containing Si of 0.05 wt % or higher can secure a good mechanical strength, a hardness, a corrosion resistance and a settling resistance. Further, containing Si of 0.40 wt % or lower can suppress a decrease in a fracture toughness and workability. The content of Si is preferably between 0.15 wt % and 0.30 wt %.

Manganese (Mn) is a component element which contributes to an improved quenching effect and a mechanical strength, as well as an additive component element for the purpose of deoxidation in a steel making process. Containing Mn of 0.50 wt % or higher can secure a good mechanical strength and a quenching effect. Further, containing Mn of 1.70 wt % or lower can suppress a decrease in a fracture toughness and a corrosion resistance due to microsegregation and in workability. The content of Mn is preferably between 0.60 wt % and 1.50 wt %, and more preferably between 0.80 wt % and 1.50 wt %.

Boron (B) is a component element which contributes to an improved quenching effect and a mechanical strength. Containing B of 0.0005 wt % to 0.003 wt % can secure a good quenching effect. Further, grain boundary strengthening improves a fracture toughness and a corrosion resistance. On the other hand, even if the content of B exceeds 0.003 wt %, an effect of improving a quenching effect is saturated and a mechanical property deteriorates, so that the upper limit of the content is limited.

Phosphorus (P) is an inevitably included impurity element remaining in a steel making process. Containing P of 0.040 wt-% or lower can suppress a decrease in a fracture toughness and a corrosion resistance due to segregation. The content of P is more preferably 0.030 wt % or lower.

Sulfur (S) is an inevitably included impurity element remaining in a steel making process. Containing S of 0.040 wt-% or lower can suppress a decrease in a fracture toughness and a corrosion resistance due to segregation or precipitation of MnS-based inclusions. The content of S is more preferably 0.030 wt % or lower.

Nickel (Ni) is a component element which contributes to an improved corrosion resistance and a quenching effect. The addition of Ni can secure a good corrosion resistance and a quenching effect, to reduce corrosion degradation and quench cracking. On the other hand, even if Ni is excessively contained, an effect of improving a quenching effect is saturated and material cost increases. Therefore, Ni is preferably 0.30 wt % or lower, or may not be intentionally added in a composition.

Chromium (Cr) is a component element which contributes to an improved strength, corrosion resistance and a quenching effect. The addition of Cr can improve a strength, a corrosion resistance and a quenching effect. On the other hand, if Cr is contained excessively, a fracture toughness and a corrosion resistance are decreased due to segregation of carbides, workability is decreased and a material cost is increased. Therefore, Cr is preferably 1.20 wt % or lower, may be 0.60 wt % or lower, or may not be intentionally added in a composition.

Copper (Cu) is a component element which contributes to an improved quenching effect and corrosion resistance. The addition of Cu can improve a quenching effect and a corrosion resistance. Note that, if Cu is contained excessively, hot surface embrittlement may occur. Therefore, Cu is preferably 0.30 wt % or lower, or may not be intentionally added in a composition.

Molybdenum (Mo) is a component element which contributes to an improved quenching effect, a fracture toughness and a corrosion resistance. The addition of Mo can improve a quenching effect, a fracture toughness and a corrosion resistance. Note that, if Mo is contained excessively, a material cost is increased. Therefore, Mo is preferably 0.08 wt % or lower, more preferably 0.02 wt % or lower, or may not be intentionally added in a composition.

Vanadium (V) is a component element which combines with nitrogen (N) to prevent fixation of boron (B) by N and contributes to an improved fracture toughness and a hardness. The addition of V can improve a fracture toughness and a hardness, and can achieve an effect by boron (B) effectively. On the other hand, if V is contained excessively, a fracture toughness and a corrosion resistance are decreased due to precipitation of carbonitrides and a material cost is increased. Therefore, V is preferably 0.30 wt % or lower, or may not be intentionally added in a composition.

Titan (Ti) is a component element which combines with nitrogen (N) to prevent fixation of boron (B) by N and contributes to an improved hardness and a corrosion resistance. The addition of Ti can improve strength and a corrosion resistance, and can achieve an effect by boron (B) effectively. On the other hand, if Ti is contained excessively, a fracture toughness and a corrosion resistance may be decreased due to precipitation of carbonitrides. Therefore, Ti is preferably 0.05 wt % or lower, or may not be intentionally added in a composition.

Niobium (Nb) is a component element which combines with nitrogen (N) to prevent fixation of boron (B) by N and contributes to an improved strength and a fracture toughness. The addition of Nb can improve a strength and a fracture toughness by micronization of crystal grains and can achieve an effect by boron (B) effectively. On the other hand, if Nb is contained excessively, a fracture toughness and a corrosion resistance may be decreased due to precipitation of carbonitrides. Therefore, Nb is preferably 0.06 wt % or lower, or may not be intentionally added in a composition.

Aluminum (Al) is a component element which combines with nitrogen (N) to prevent fixation of boron (B) by N and contributes to an improved fracture toughness, as well as an additive component element for the purpose of deoxidation in a steel making process. The addition of Al can improve a strength and a fracture toughness by micronization of crystal grains and can achieve an effect by boron (B) effectively. On the other hand, if Al is contained excessively, a fracture toughness and a corrosion resistance may be decreased due to precipitation of nitrides or oxides. Therefore, Al is preferably 0.30 wt % or lower, or may not be intentionally added in a composition. Al indicates soluble Al.

Nitrogen (N) is an inevitably included impurity element remaining in a steel making process and is a component element contributing to an improved strength. Containing N having a content within a certain range improves a strength while avoiding degradation in a fracture toughness and a corrosion resistance due to precipitation of nitrides. The content of N is preferably 0.02 wt % or lower.

Calcium (Ca) is a component element which contributes to improved machinability. The addition of Ca can further improve machinability of a steel material. The content of Al is preferably 0.40 wt % or lower, or may not be intentionally added in a composition.

Lead (Pb) is a component element which contributes to improved machinability. The addition of Pb can further improve machinability of a steel material. The content of Pb is preferably 0.40 wt % or lower, or may not be intentionally added in a composition.

A hot-rolled steel material may be used as a steel bar material of a manganese boron steel having a low carbon content. The hot-rolled steel material may be annealed such as cold rolling and spheroidizing annealing after hot rolling as necessary. Further, a cold-rolled steel material may be used in place of the hot-rolled steel material. In hot rolling, a heating temperature of a slab is preferably between 1150° C. and 1350° C., and a finishing temperature is preferably between 800° C. and 1000° C. A finishing temperature at 800° C. or higher can solutionize component elements properly, to obtain an effect of improving a quenching effect by solid solution boron effectively. Further, a finishing temperature at 1000° C. or lower can avoid coarsening of austenite crystal grains, to prevent degradation in a hardness and season cracking due to residual austenite. A winding temperature may be, for example, between 400° C. and 650° C., etc.

Next, an example of a production method for stabilizers according to the embodiment will be described along each production step.

FIG. 2 is a flow chart illustrating steps of the production method for stabilizers according to the embodiment of the invention.

The production method for stabilizers illustrated in FIG. 2 includes a machining step S10, a heating step S20, a forming step S30, a quenching step S40, a shot-peening step S50, a precoating treatment step S60, a preheating step S70, a coating step S80 and a post-heating step S90 sequentially. Note that, in the production method, the shot-peening step S50 and the preheating step S70 are not essential and may be omitted as described later.

In the machining step S10, both end portions of the steel bar as a material for a stabilizer are machined for forming the coupling portions which are coupled with the stabilizer links 2 (see FIG. 1). The above-mentioned steel bar material of a manganese boron steel having a low carbon content is used as a material for the stabilizer. The length and the diameter of the steel bar may be determined to a suitable size depending on a desired product shape. However, the diameter is preferably set to be in a range of 10 mm to 32 mm. Also, the configuration and the forming method for the coupling portions are not particularly limited, and, for example, the distal ends of the steel bar are forged into a flat shape to form the coupling portions by boring such as press working.

In the heating step S20, the steel bar is heated for bending. As the heating method, heating in a heating furnace, electric heating, high frequency induction heating or the like may be used appropriately, and the high frequency induction heating is preferably used. In the production method for the stabilizer 1 according to the embodiment, since a manganese boron steel material having a good quenching effect is used as a material, it is possible to apply rapid heating by high frequency induction heating. Therefore, rapid heating suppresses decarburization and deboronation while the steel bar is being heated.

In the forming step S30, the heated steel bar is subjected to hot (warm) bending to be formed into a product shape. That is, the steel bar is bent to form the torsion portion 1a and the arm portions 1b for transforming the shape of the steel bar into a desired shape of the stabilizer. Note that a plurality of portions is bent in such a manner that a plurality of bent portions 1c may be formed depending on a desired product shape. The torsion portion 1a and the arm portions 1b may be formed through a plurality of bending steps.

In the quenching step S40, the bent steel bar is austenitized and is quenched at a cooling rate equal to a lower critical cooling rate or above. Specifically, the bent steel bar is quenched in a medium having a heat transfer coefficient higher than, or close to that of water. The heat transfer coefficient to the medium is preferably within a range of ±10% with respect to a heat transfer coefficient value to water which is stationary or flowing on the steel bar. A quenching temperature, a heating rate and quenching duration may be determined in an appropriate range. For example, the quenching temperature may be determined between 850° C. and 1100° C. or the like. Note that the quenching temperature is preferably set under an austenitized temperature (AC3)+100° C. in view of avoiding excessively coarse austenite grains and quench cracking. After such heating, the steel bar is cooled with a cooling agent to transform its metal texture into martensite.

The quenching step may preferably include, specifically, water quenching, polymer quenching or salt water quenching. The water quenching uses water as a cooling agent. A water temperature may be set in a range of 0° C. to 100° C., preferably 5° C. to 40° C. The polymer (water solution) quenching uses water solution added with polymer as a cooling agent. As the polymer, various polymers may be used such as polyalkylene glycol, polyvinyl pyrrolidone. Polymer concentration is not particularly limited as long as the given heat transfer rate described above is maintained, and may be adjusted based on a type of the polymer or how much the steel bar in the process is quenched. The salt water quenching uses a water solution added with salt such as sodium chloride as a cooling agent. Salt concentration is not particularly limited as long as the given heat transfer coefficient is maintained and may be adjusted based on a degree of quenching of the steel bar in the process. In the quenching processes, the cooling agent may be optionally stirred. In addition, the quenching process may be done with restraint quenching, spray quenching or injection quenching. In the production method for stabilizers according to the embodiment, the steel bar quenched as above (hereinafter, also referred to as a semi-finished product of the stabilizer) proceeds to the shot-peening step S50 or the precoating treatment step S60, without being tempered.

In the shot-peening step S50, the quenched steel bar is applied with hot or cold shot-peening which may be repeated while conditions such as a grain size and projection speed are changed. Applying the shot-peening gives a compressive residual stress on the surface of the steel bar, and prevents season cracking, stress corrosion cracking and the like as well as for improving a fatigue strength and a wear resistance. The shot-peening on the quenched bar steel material may be omitted for reasons described below. In other words, as illustrated in FIG. 2, after the quenching step S40, the precoating treatment step S60 may be executed without the shot-peening step S50.

In the precoating treatment step S60, the steel bar is subjected to surface cleaning or a surface process for coating. Specifically, the surface of the steel bar is subjected to various preprocesses such as a removal process for removing grease and foreign matters and surface preparation. As the surface preparation, for example, a film made of zinc phosphate, iron phosphate or the like is formed. After each process such as removal and surface preparation, the steel bar is washed with water and is fed to various processes in subsequent steps sequentially. As a method for drying the water-washed steel bar, for example, water absorption drying using a drying roller or the like, blow-drying, heat drying or a combination thereof may be used appropriately. As illustrated in FIG. 2, the machined steel bar is subjected to the preheating step S70 or the coating step S80.

In the preheating step S70, the steel bar is preheated. Preheating the steel bar to be coated in advance shortens baking time for coating in the post-heating to improve coating process efficiency. Further, a temperature rise of a coating material cannot be biased on a surface side, and can improve adhesion of the coating film. As the heating method, heating in a heating furnace, electric heating, high frequency induction heating, or the like may be used appropriately. The electrical heating is preferably used in terms of a fast heating rate and a simple facility. A preheating temperature is, for example, preferably be in a range of 180° C. to 200° C. where the coating material can be coated on the steel bar. Preheating at the temperature brings about an effect by low temperature annealing, and a re-cooling process to a coating temperature for the coating material is unnecessary after the low temperature annealing. Note that, in a case where drying by heat drying is executed, remaining heat after the heat drying may be used for coating the coating material. Therefore, if a heat drying temperature in the drying is sufficiently high, the coating step S80 may be executed after the precoating treatment step S60, without the preheating step S70.

In the coating step S80, the steel bar is coated with a coating material. A powder coating material is preferably used for the coating material, and, for example, an epoxy resin powder coating material is preferably used. A coating method is such that, for example, the coating material is injected on the surface of the steel bar to form a coating film having a thickness of 50 µm, or the steel bar is immersed in the coating material.

In the post-heating step S90, the coating material is baked with heat. Heating in a heating furnace is preferably used as the heating method. A post-heating temperature is preferably set, for example, in a range of 180° C. to 200° C. Specifically, for example, the steel bar coated with the coating material is subjected to post-heating at 180° C. for five minutes or at 200° C. for five minutes. With such heating conditions, a semi-finished product of the stabilizer does not suffer degradation of a strength and a hardness due to heating. Note that, electrodeposition coating, solvent coating or the like as a coating process may be applied in place of the preheating step S70, the coating step S80 and the post-heating step S90.

Through the steps described above, the stabilizer 1 is produced. The produced stabilizer 1 is made of a manganese boron steel material having a low carbon content, and is quenched in a medium having the heat transfer coefficient higher than or close to that of water, so that a compressive residual stress remains and a good mechanical strength and a fracture toughness are achieved. The compressive residual stress and fracture toughness prevent season cracking, and the stabilizer 1 has improved corrosion resistance with the formation of the martensite texture having a low carbon content. In addition, in the production method for stabilizers according to the embodiment, the manganese boron steel material having a low carbon content is used, to have advantages described below as compared with the conventional production method.

FIG. 3 is a flow chart illustrating steps of a production method for stabilizers according to a comparative example.

As illustrated in FIG. 3, in the conventional production method for stabilizers (production method for stabilizers according to the comparative example), after the machining step S10, the heating step S20 and the forming step S30, the bent steel bar is subjected to a quenching step 140 with oil. The production method for stabilizers according to the comparative example uses oil quenching with mineral oil as a cooling agent to slow down a cooling temperature rate of the steel material which has been heated to a quenching temperature, reducing distortion and quench cracking. After the oil quenching, tempering is executed for adjusting mechanical strength and fracture toughness. The production method for stabilizers according to the comparative example uses such steps because a fracture toughness and a quenching effect of the steel material used as a material for the conventional stabilizer after the quenching are not necessarily enough for required properties of a stabilizer product.

In contrast, the production method for the stabilizers according to the embodiment uses a manganese boron steel material having a low carbon content which maintains a high strength and a good fracture toughness. Therefore, tempering is not necessary after quenching, and the stabilizer 1 having both a good mechanical strength and a fracture toughness is produced. Accordingly, in the production line for the stabilizers, an elongated tempering furnace does not need to be provided, so that a facility scale can be downsized, and manpower for tempering and an operating cost associated with heating for tempering can be reduced.

Further, in the production method for stabilizers according to the embodiment, a manganese boron steel material with a low carbon content having a good quenching effect is used, preventing distortion and quench cracking due to defects of quenching. Therefore, even if a quenching condition with a faster cooling rate than that of the conventional oil quenching is adopted, a workpiece (steel bar) is less likely to be damaged by quench cracking and heat deformation, and quenching having a faster cooling rate than that of the conventional oil quenching can be used in a production steps. Using a quenching method having a faster cooling rate suppresses formation of the residual austenite and prevents season cracking. Further, oil quenching may be replaced by water quenching, polymer quenching or salt water quenching, which makes security management for an oil cooling agent such as mineral oil and a disposal cost unnecessary to produce the stabilizer 1 efficiently. Still further, as described below, it is possible to obtain an effect which gives a compressive residual stress (for example, 150 MPa or higher) on a surface layer (at least up to 0.8 mm in depth from the surface) of the stabilizer 1.

Figure 4A:
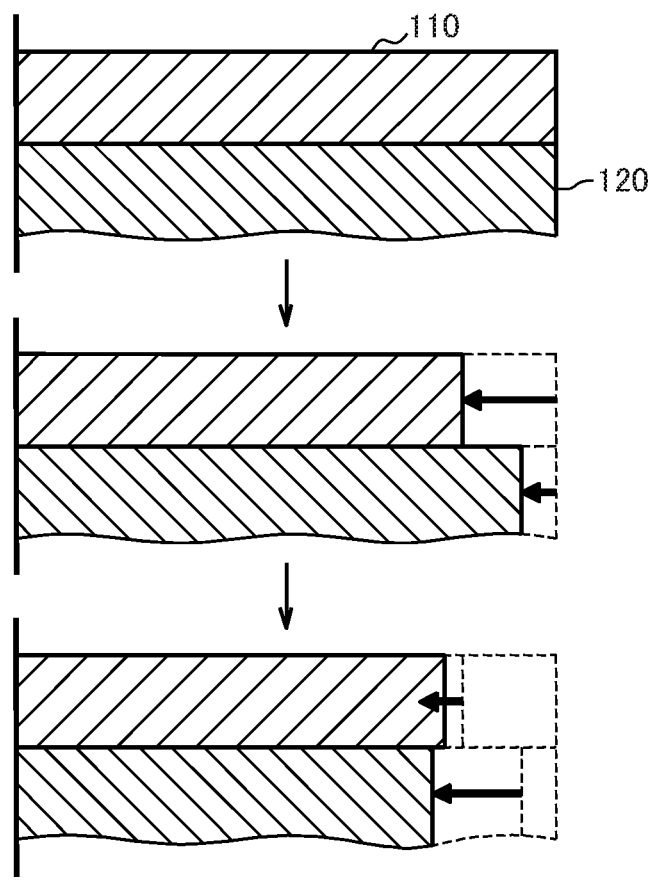
Figure 4B:
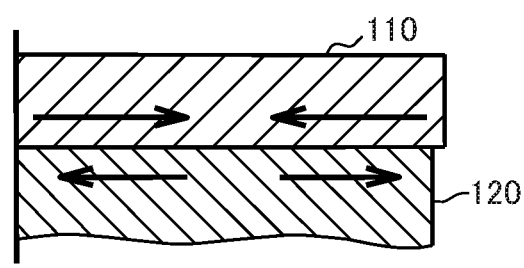
Figure 5A:
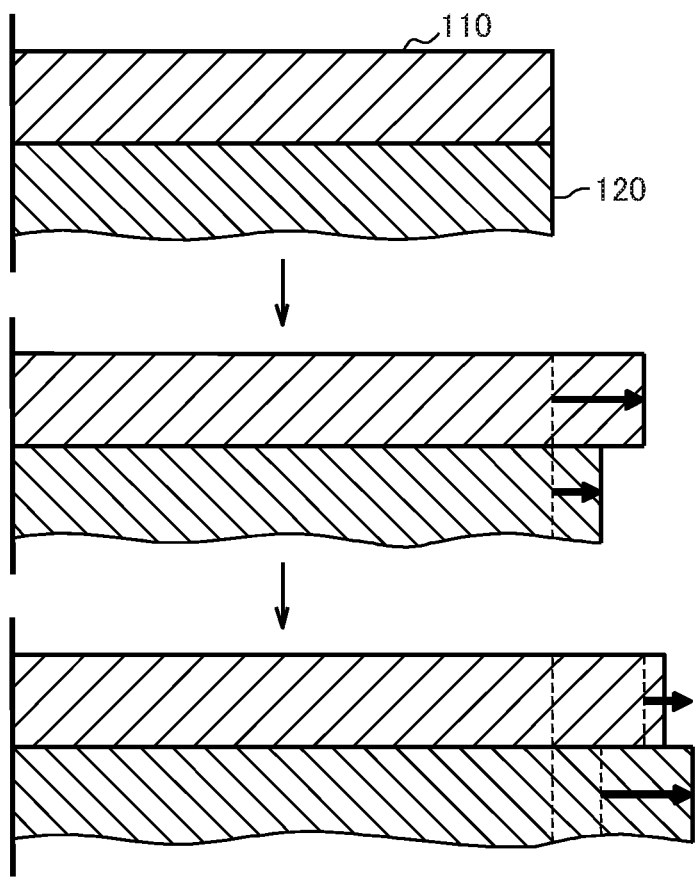
Figure 5B:
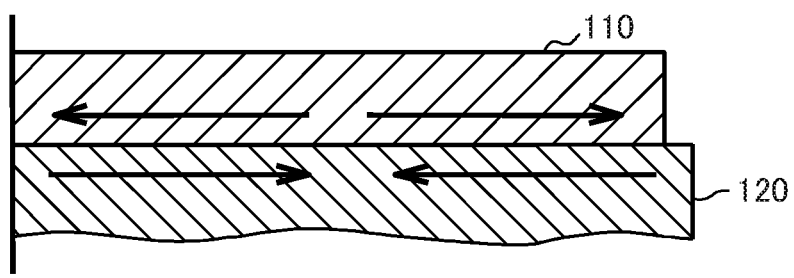

FIGS. 4A and 4B are conceptual diagrams illustrating a mechanism of generation of a residual stress caused by a thermal stress. FIG. 4A illustrates a deformation process due to cooling and FIG. 4B illustrates a residual stress after plastic deformation. In contrast, FIGS. 5A and 5B are conceptual diagrams illustrating a mechanism of generation of a residual stress caused by a transformation stress. FIG. 5A illustrates a deformation process caused by martensitic transformation and FIG. 5B illustrates a residual stress after the plastic deformation.

In FIGS. 4A to 5B, volume changes of a texture in the vicinity of a surface of a steel material are illustrated schematically. Reference numeral 110 indicates a surface texture on a surface side and reference numeral 120 indicates an inner texture in an inner side of the steel material.

The thermal stress generated through quenching affects in a depth direction where thermal contraction of the cooled steel material is influenced by a cooling rate difference in the depth direction of the steel material. Normally, through quenching, the inner side of a steel material is heated above a transformation temperature, and as illustrated at the top in FIG. 4A, the stress and strain in the surface texture 110 and inner texture 120 are not practically observed. When the steel material is quenched from this state, the steel material is gradually cooled from the surface texture 110 to the inner texture 120 as time passes, which causes the cooling rate difference between the surface side and the inner side. Accordingly, the surface texture 110 contracts thermally more than the inner texture 120 to be cooled later than the surface texture 110, and the inner texture 120 to be cooled later follows the contraction deformation of the surface texture 110 and contracts by plastic deformation (see the middle in FIG. 4A).

When the steel material is further cooled, as illustrated at the bottom in FIG. 4A, in the surface texture 110, solidification of the metal texture terminates and the dimension thereof is unchanged. In contrast, the inner texture 120 to be cooled later is still cooled to continue thermal contraction. Finally, contraction by plastic deformation of the inner texture 120 in the thermal contraction terminates, while restraining the surface texture 110 in a contraction direction. As a result, as illustrated in FIG. 4B, the surface texture 110 receives contraction force by the inner texture 120 so that a compressive residual stress is dominant in the depth direction in the surface texture 110. In contrast, the inner texture 120 receives stretching force by the surface texture 110 so that a tensile residual stress is dominant in the depth direction in the inner texture 120.

On the other hand, the transformation stress generated through quenching has a reverse distribution to the thermal stress, in which expansion caused by martensitic transformation in the cooled steel material is restrained based on the cooling rate difference in the depth direction of the steel material. When the steel material is quenched in a state where a stress and distortion are not practically observed in the surface texture 110 and the inner texture 120 as illustrated at the top in FIG. 5A, the steel material is cooled from the surface texture 110, to generate the cooling rate difference between the surface side and the inner side. Therefore, the surface texture 110 cools below a martensitic transformation start temperature (Ms) earlier than the inner texture 120 to be cooled later, and expands greatly as the martensitic transformation. In contrast, the inner texture 120 to be cooled later follows the surface texture 110 and deforms plastically (see the middle in FIG. 5A).

When the steel material is further cooled, as illustrated at the bottom in FIG. 5A, the surface texture 110 cools below a martensitic transformation end temperature (Mf) faster than the inner texture 120 to be cooled later and the volume change of the metal texture terminates. On the other hand, the inner texture 120 to be cooled later still expands due to the martensitic transformation in a temperature range between the martensitic transformation start temperature (Ms) and martensitic transformation end temperature (Mf). The plastic deformation of the expanding inner texture 120 terminates while restraining the surface texture 110 in a tensile direction. As a result, as illustrated in FIG. 5B, the surface texture 110 is pulled by the expansion of the inner texture 120 so that the tensile residual stress among the residual stress to be generated is dominant at the surface texture 110. In contrast, the inner texture 120 receives compressive force from the surface texture 110 so that the compressive residual stress is dominant at the inner texture 120. From the above, the residual force has a distribution of opposite direction with respect to the thermal stress.

The quenched steel material has, in practice, a distribution of a surface residual stress in the depth direction on a balance between the residual stress caused by the thermal stress and the residual stress caused by the transformation stress. Accordingly, it is effective to perform a heating process in which a thermal stress occurs more likely than a transformation stress, when a compressive residual stress effective to improve a fatigue strength and a wear resistance is given.

In this regard, the production method for stabilizers according to the embodiment takes into account of a low carbon martensite texture having a high strength and a high fracture toughness, and uses a manganese boron steel material having a lower carbon content than a spring steel material used conventionally. In addition, quenching having a faster cooling rate than a conventional oil quenching is applied with a medium having a heat transfer coefficient higher than or close to that of water. Thus, a volume change associated with martensitic transformation is suppressed to reduce a transformation stress, and a large thermal stress is generated by rapid cooling. As a result, a residual stress caused by a thermal stress is more dominant than a residual stress caused by a transformation stress, and a compressive residual stress suitable for the stabilizer 1 is applied on a surface of a quenched steel bar. This may arise from the fact that heat can be absorbed from a steel material more quickly because the heat transfer coefficient to water is larger than that to oil. Further, the quenching step S40 for quenching by a fast cooling rate gives a deep and large compressive residual stress, while a steel bar is being quenched (see FIG. 9A). Therefore, the stabilizer 1 is produced on which a compressive residual stress is applied, without executing shot-peening step S50 on a quenched steel bar in water. In short, the stabilizer 1 is produced by the embodiment (invention) without executing tempering and shot-peening.

In the conventional (comparative example) production method for stabilizers, as illustrated in FIG. 3, the precoating treatment step S60, the coating step S80 for coating a powder coating material on a steel bar in an atmospheric temperature, and the heating step S190 for baking the coated powder coating material are executed as post-steps of the shot-peening step S50. In contrast, in the production method for stabilizers according to the embodiment, since a compressive residual stress deeper than shot-peening is applied in the quenching step S40 (see FIGS. 9A and 10A), the residual stress is less likely to be released excessively by the heating process in the preheating step S70 and the post-heating step S90. Accordingly, it is advantageous that an allowable condition range for heating condition in the preheating step S70 and the post-heating step S90 is extended.

The stabilizer 1 produced by the production method for stabilizers according to the above embodiment is practically created of a metal texture of a substantially single phase martensite texture. More specifically, 90% or higher of the center portion in a cross-section of a semi-finished product of the stabilizer 1 may be formed of a martensite texture. Usually, a metal texture which is made of a conventional spring steel material and which is obtained by executing oil quenching and tempering is formed in a two-phase texture of ferrite and cementite. A local cell may be easily formed between the phases. In contrast, in the production method for stabilizers according to the embodiment, a manganese boron steel having a low carbon content is used as a material, and can form a single phase martensitic texture which is hardly decomposed and reduces precipitated carbides. Therefore, a local cell is hardly formed in a metal texture, and the stabilizer 1 having an excellent corrosion resistance is produced in comparison with a stabilizer made of a conventional spring steel material.

The stabilizer 1 produced with the production method for stabilizers according to the embodiment preferably has the grain size number G exceeding 8 for a grain size of a prior austenite grain boundary, and more preferably 9 or higher. Refinement of the grain size of the prior austenite crystal grain boundary further improves mechanical strength without impairing a fracture toughness. The refinement of grain size is implemented by, for example, lowering a quenching temperature, or increasing the content of Mn or optional additive elements. Note that the grain size of the prior austenite crystal grain boundary can be measured according to the provision of JIS G 0551. The grain size number G can be determined based on a microscopic image of a metal texture in quenching, and is obtained as an average value of the grain number of, desirably, a visual field 5 to 10.

Further, the stabilizer 1 produced by the production method for stabilizers according to the embodiment preferably has a range of a Rockwell hardness (HRC) which exceeds 44.5 and is 55.5 or lower. Such a hardness is realized with a required fracture toughness in a range of carbon content between 0.15 wt % and 0.39 wt %. The produced stabilizer 1 having such a hardness has a good fracture toughness (for example, 30 J/cm$^2$ or higher of a Charpy impact value in a room temperature at HRC 44.5), compared to a stabilizer made of a conventional spring steel material and adjusted to the same hardness.

Embodiment

Hereinafter, a description will be given of the invention in greater detail with reference to an embodiment of the invention, but the technical scope of the invention is not limited thereto.

First, a correlation between a hardness, a carbon content and an impact value was evaluated for steel materials (samples 1 to 9) having a chemical composition structures illustrated in the following Table 1. Note that the samples 1 to 8 are made of a manganese boron steel material and the sample 9 is made of a conventional spring steel material (SUP9A ("SUP9N")).

TABLE 1

|  | C | Si | Mn | Cr | P | S | Cu | Ni | Mo | B |
|---|---|---|---|---|---|---|---|---|---|---|
| Sample 1 | 0.20 | 0.19 | 0.94 | 0.35 | 0.016 | 0.007 | 0.16 | 0.06 | — | 0.0019 |
| Sample 2 | 0.24 | 0.19 | 0.88 | 0.24 | 0.014 | 0.011 | 0.08 | 0.05 | 0.010 | 0.0023 |
| Sample 3 | 0.25 | 0.20 | 0.90 | 0.24 | 0.014 | 0.014 | 0.12 | 0.07 | 0.010 | 0.0021 |
| Sample 4 | 0.25 | 0.30 | 1.33 | 0.13 | 0.022 | 0.003 | 0.21 | 0.07 | 0.018 | 0.0013 |
| Sample 5 | 0.28 | 0.19 | 0.87 | 0.014 | 0.014 | 0.013 | 0.14 | 0.07 | 0.010 | 0.0019 |
| Sample 6 | 0.31 | 0.05 | 0.95 | 0.41 | 0.007 | 0.004 | 0.06 | 0.04 | — | 0.0018 |
| Sample 7 | 0.35 | 0.20 | 0.96 | 0.17 | 0.013 | 0.024 | 0.17 | 0.05 | — | 0.0022 |
| Sample 8 | 0.39 | 0.20 | 0.81 | 0.13 | 0.022 | 0.006 | 0.20 | 0.05 | — | 0.0020 |
| Sample 9 | 0.57 | 0.20 | 0.88 | 0.87 | 0.013 | 0.015 | 0.08 | 0.06 | — | — |

In an impact test, a JIS No. 3 piece (2 mm depth of U-notch) which was sampled from each sample was used to calculate an impact value uE20 (J/cm$^2$). Note that a sample was formed by melting each composition steel illustrated in Table 1 to a steel ingot, and was welded to a square billet to form a hot rolled material. Then, the test piece was sampled from a steel bar which was sampled from the hot rolled material subjected to water quenching.

Figure 6:
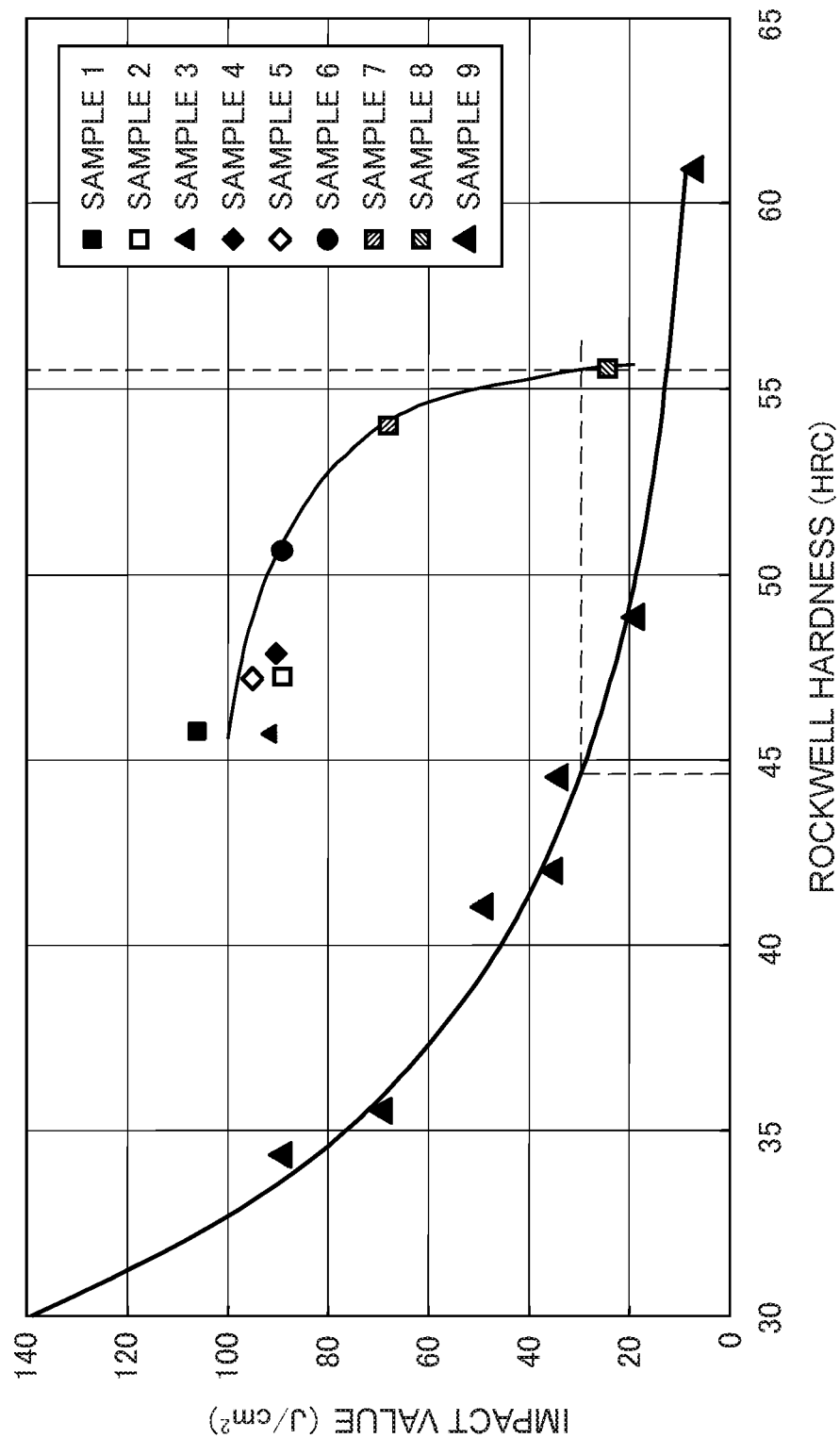
FIG. 6 is a graph illustrating a correlation between a Rockwell hardness and impact values of a manganese boron steel material.
Figure 7:
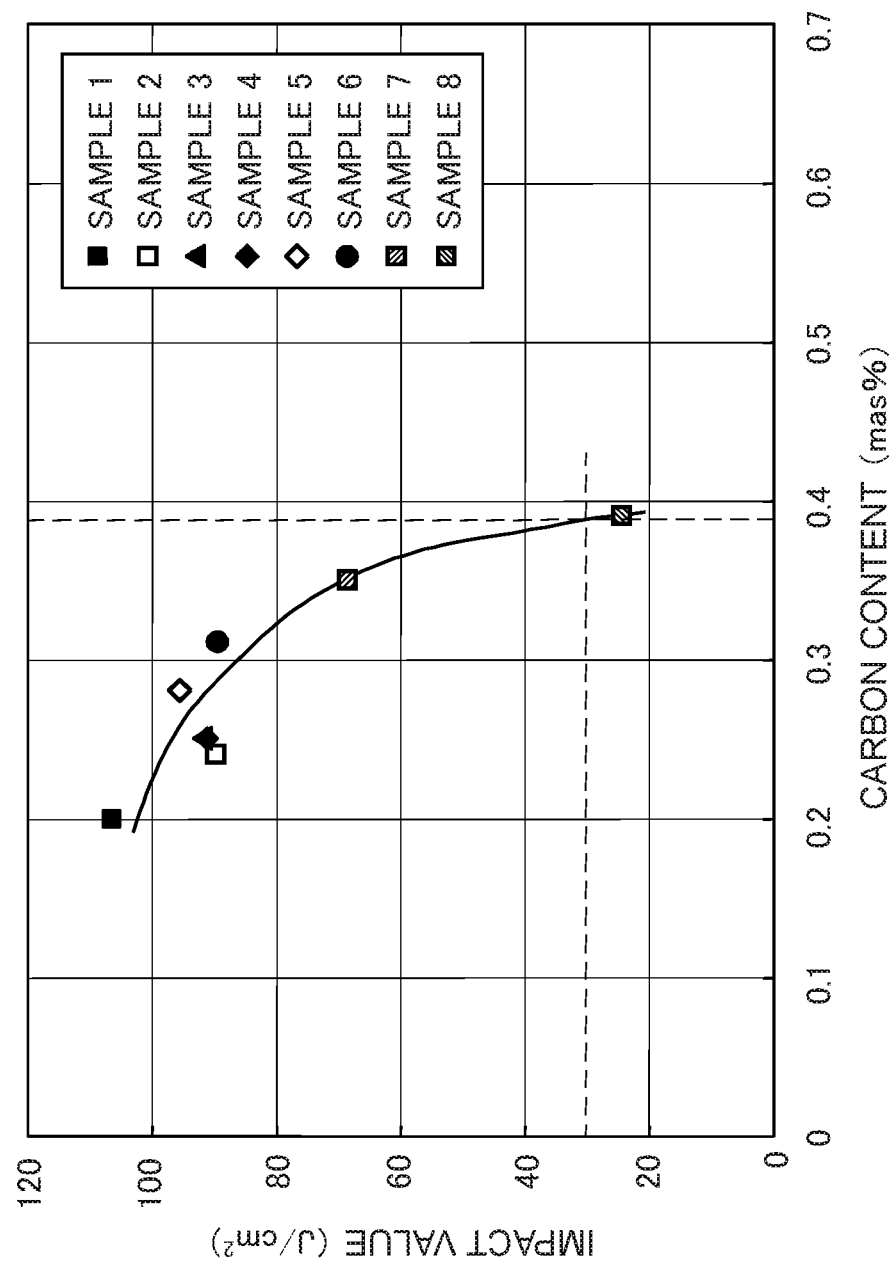
FIG. 7 is a graph illustrating a correlation between carbon contents and the impact values of the manganese boron steel material.

FIG. 6 is a graph illustrating a correlation between a Rockwell hardness of a manganese boron steel material and an impact value. FIG. 7 is a graph illustrating a correlation between carbon contents of the manganese boron steel material and an impact value.

As illustrated in FIG. 6, the samples 9 as a conventional spring steel material take impact values of about 30 J/cm$^2$ at a practical hardness upper limit (HRC 44.5) of the stabilizer (indicated by a broken line in FIG. 6). In contrast, the samples 1 to 8 made of a manganese boron steel material take impact values more than about 30 J/cm$^2$ at the practical hardness upper limit (HRC 44.5) of the stabilizer of the samples 9 in a range of HRC 44.5 to 56, so that both a mechanical strength and a fracture toughness are achieved. Further, as illustrated in FIG. 7, an impact value in the manganese boron steel material shows a negative correlation to the carbon content (wt %) of each sample, showing that the fracture toughness is largely dependent on the carbon content. The impact values of the samples 1 to 8 made of a manganese boron steel material exceed the impact value (30 J/cm$^2$) achieved in the samples 9 in a range where the carbon content is 0.39 wt % or lower (illustrated by a broken line in FIG. 7). Therefore, it is observed that a manganese boron steel having a carbon content of 0.39 wt % or lower is preferably used as a material for the stabilizer.

Next, stabilizers of examples 1-1 to 1-3 were produced to evaluate durability. As a comparison, a stabilizer of the comparative example 1 was produced for evaluation.

Example 1-1

The stabilizer of the example 1-1 was made of the sample 1 illustrated in Table 1 as a material, and was produced through the forming step S30 for cooling for bending and the quenching step S40 for water quenching, without tempering. Note that the diameter of the stabilizer was set at 23 mm.

Example 1-2

The stabilizer of the example 1-2 was produced with the sample 4 illustrated in Table 1 as a material in the same manner as the example 1-1.

Example 1-3

The stabilizer of the example 1-3 was produced by heating for bending instead of the forming step S30, in the same manner as the example 1-1.

Comparative Example 1

A stabilizer of a comparative example 1 was made of the sample 9 illustrated in Table 1 as a material and was produced through oil quenching and tempering. Note that the diameter of the stabilizer was set at 23 mm.

A durability test was executed on each produced stabilizer. In the durability test, both end portions of the stabilizer were fixed to load a given repeated stress, so as to calculate a fatigue limit under the repeated load.

Figure 8:
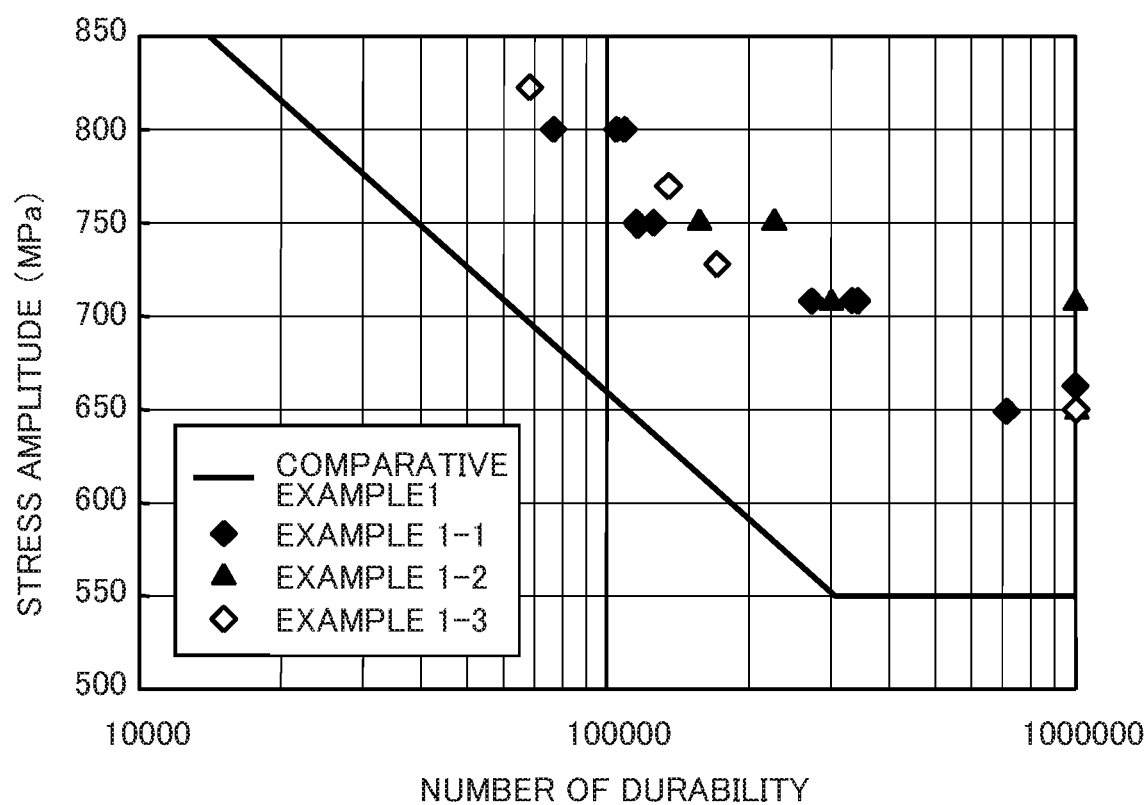
FIG. 8 is an S-N graph of the stabilizer according to the embodiment.

FIG. 8 is an S-N graph of a stabilizer according to the examples.

As illustrated in FIG. 8, it is observed that the stabilizers of the examples 1-1 to 1-3 have more improved durability, compared to the stabilizer of the comparative example 1 shown by a solid line. Further, it is observed that the stabilizer of the example 1-1 has the same fatigue limit as that of the stabilizer of the example 1-3, and either heating or cooling for bending may be applied.

Next, stabilizers of examples 2-1 to 2-4 were produced to evaluate a surface residual stress. Further, as a comparison, stabilizers of comparative examples 2-1 and 2-2 were produced for evaluation.

Example 2-1

The stabilizer of the example 2-1 was formed with the sample 1 illustrated in Table 1 as a material, and was produced through the forming step S30 and the quenching step S40 for water quenching, without shot-peening step S50.

Example 2-2

The stabilizer of the example 2-2 was produced in the same manner as the example 2-1, except that the material was replaced by the sample 4 illustrated in Table 1.

Example 2-3

The stabilizer of the example 2-3 was made of the sample 1 illustrated in Table 1 as a material, and was produced through the forming step S30, the quenching step S40 for water quenching and the shot-peening step S50.

Example 2-4

The stabilizer of the example 2-4 was produced in the same manner as the example 2-3, except that the material was replaced by the sample 4 illustrated in Table 1.

Comparative Example 2-1

The stabilizer of the comparative example 2-1 was made of the sample 9 illustrated in Table 1 and was produced through oil quenching and tempering, without shot-peening.

Comparative Example 2-2

The stabilizer of the comparative example 2-2 was made of the sample 9 illustrated in Table 1 and was produced through oil quenching, tempering and shot-peening.

Figure 9A:
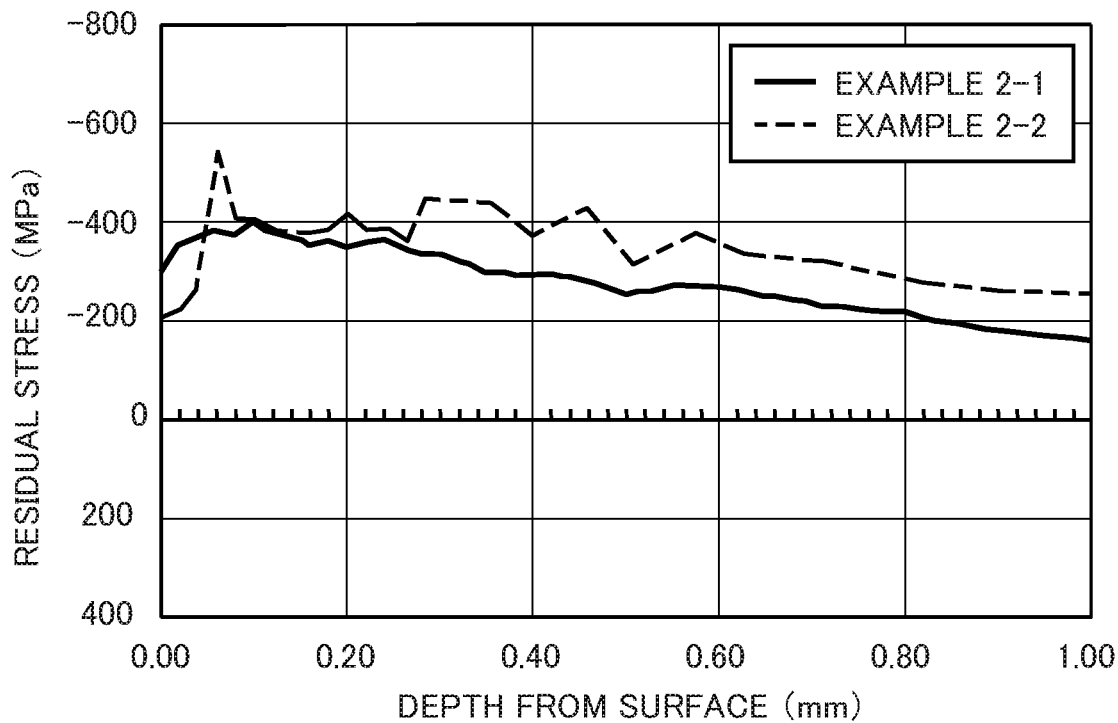
Figure 9B:
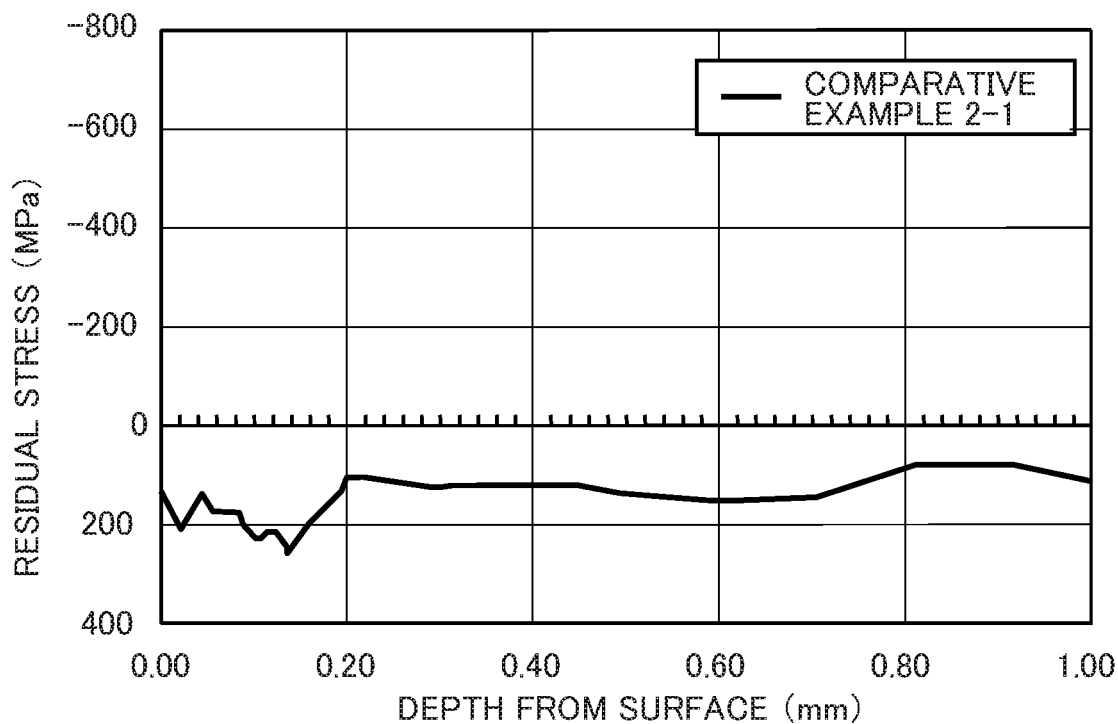
Figure 10A:
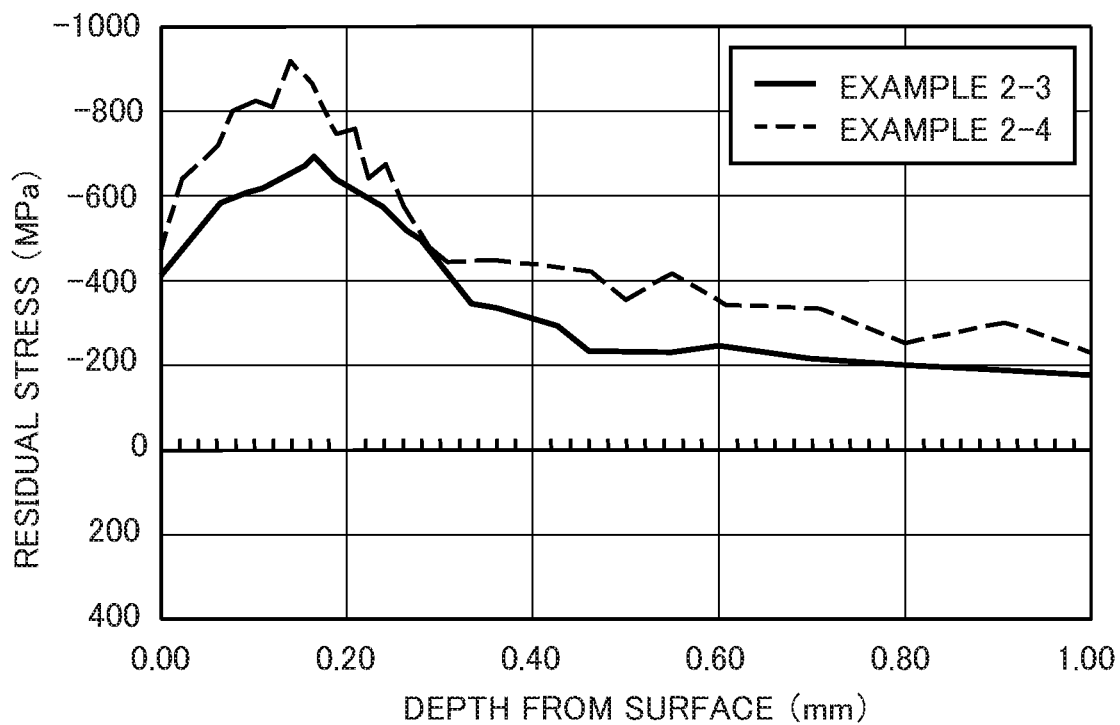
Figure 10B:
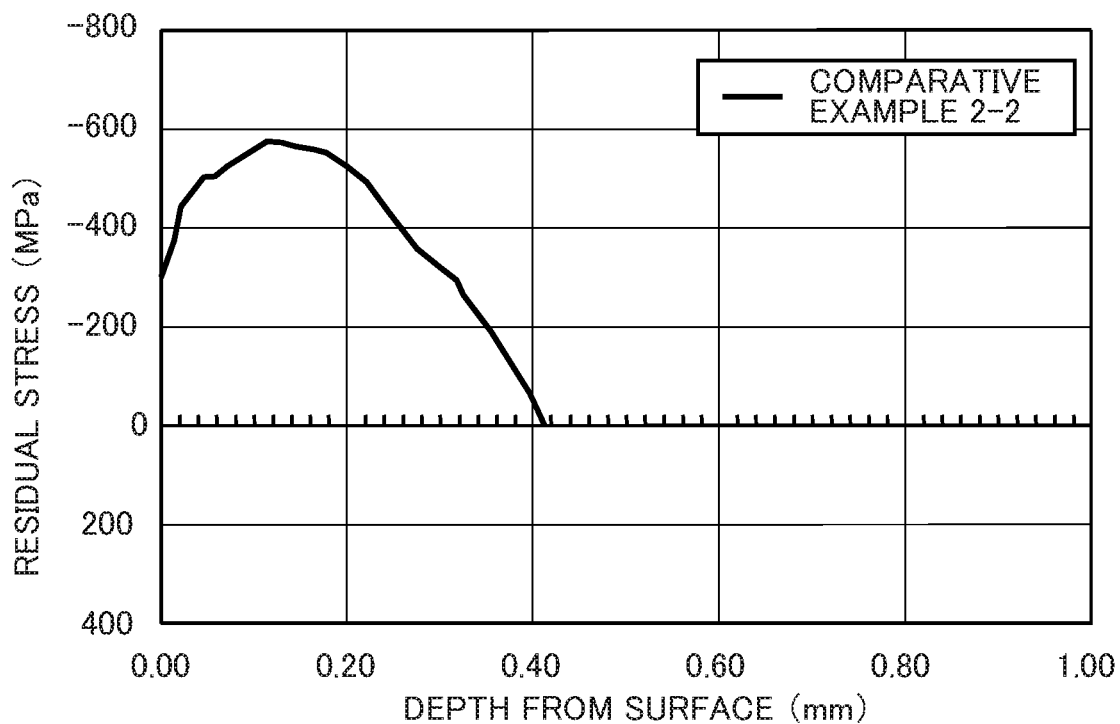

FIGS. 9A and 9B are graphs illustrating measurement results of the surface residual stress in the stabilizer produced without shot-peening. FIG. 9A is a graph illustrating the results of the stabilizer according to the examples, and FIG. 9B is a graph illustrating the results of the stabilizer according to the comparative example. Further, FIGS. 10A and 10B are graphs illustrating measurement results of the surface residual stress in the stabilizer produced with shot-peening. FIG. 10A is a graph illustrating the results of the stabilizer according to the examples, and FIG. 10B is a graph illustrating the results of the stabilizer according to the comparative example.

In FIGS. 9A to 10B, a vertical axis indicates the residual stress (MPa). A minus (−) side indicates a compressive stress and a positive (+) side indicates a tensile stress. As illustrated in FIG. 9A, it is observed that, in the examples 2-1 and 2-2, the compressive residual stress is generated deeply as compared to FIG. 9B of the comparative example, even without being tempered and shot-peened. In particular, a point where the compressive residual stress is changed to the tensile residual stress is set at least 0.8 mm or deeper in depth from the surface, and a compressive residual stress (compressive residual stress without a load) of 150 MPa or higher is observed at 0.8 mm in depth from the surface.

Further, in the examples 2-1 and 2-2, the residual stress is relatively large, and only if quenching having a fast cooling rate is executed, it is observed that an effective compressive residual stress can be applied by referring to the surface residual stress of the stabilizer that is shot-peened in the comparative example illustrated in FIG. 10B, even if shot-peening is omitted. In particular, the compressive residual stress (compressive residual stress without a load) at 0.42 mm in depth from the surface is about 200 MPa or higher, the compressive residual stress (compressive residual stress without a load) at 0.8 mm in depth from the surface is 150 MPa or higher, and the compressive residual stress (compressive residual stress without a load) at 1.0 mm in depth from the surface is 100 MPa or higher, which means that the compressive residual stress of 150 MPa or higher is distributed from the surface up to at least 0.8 mm in depth. In contrast, in the comparative example 2-1 (see FIG. 9B), the tensile residual stresses is distributed, and, in oil quenching, it is observed that the surface residual stress due to thermal stress is hardly dominant.

On the other hand, as illustrated in FIGS. 10A and 10B, in the examples 2-3 and 2-4 which were shot-peened (see FIG. 10A), the compressive residual stress on the surface side is found to be higher, as compared with the examples 2-1 and 2-2 (see FIG. 9A). In contrast, in the comparative example 2-2 (see FIG. 10B), the compressive residual stress on the surface side is found to be higher with oil quenching and shot-peening, but the distribution of the compressive residual stress remains on the surface side (0.42 mm or lower from the surface in FIG. 10B). Therefore, in the stabilizer of the comparative example, cracking easily extends from a starting point which is the vicinity of a bottom of a grown corrosion pit, and a sufficient fatigue strength and a corrosion resistance may not be obtained.

Next, correlations were analyzed between the surface residual stress and a carbon content and a diameter of the manganese boron steel material.

Firstly, semi-finished products of the stabilizer were produced with the samples 1, 2, 6, 7 and 8 having a different carbon content from each other through the forming step S30 and the quenching step S40 for water quenching, without tempering. Secondly, the surface residual stress of the manganese boron steel material was measured. Note that diameters of the products were in a range of 21 mm to 25 mm. Further, the correlation between the surface residual stress and the diameter was estimated by simulating a possible surface residual stress in each diameter for water quenching (water cooling) and for oil quenching (oil cooling).

Figure 11A:
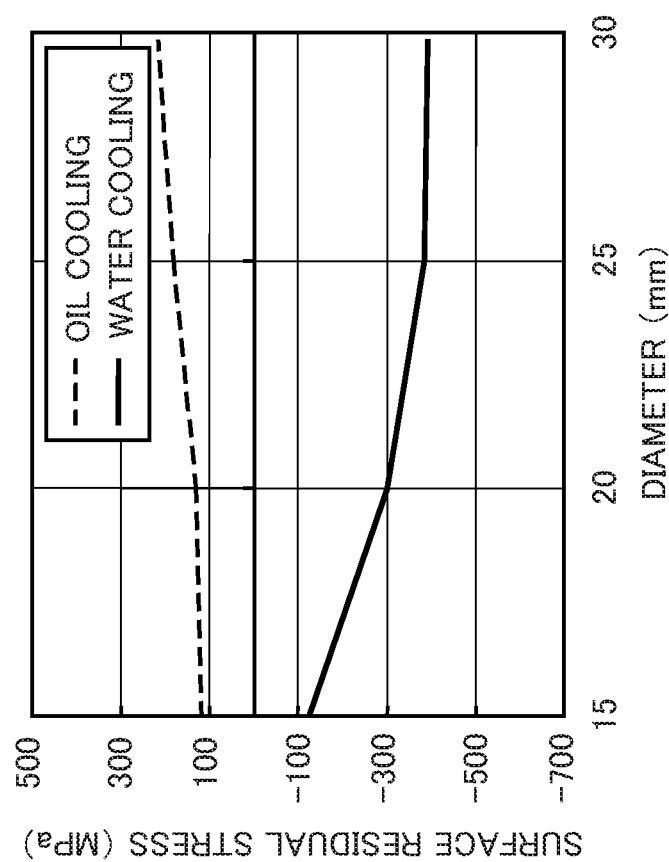
Figure 11B:
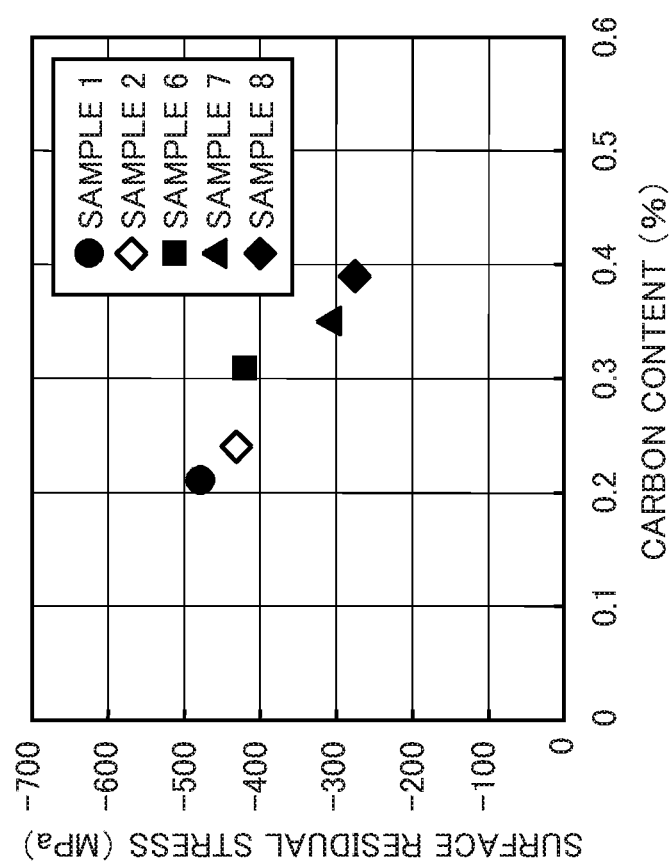

FIGS. 11A and 11B are graphs illustrating results of an analyzed surface residual stress in the stabilizers according to the examples. FIG. 11A is a graph illustrating a relationship between the surface residual stress and the carbon contents of the steel materials, and FIG. 11B is a graph illustrating a relationship between the surface residual stress and the diameters of the steel materials.

As illustrated in FIG. 11A, the compressive residual stress applied on the surface by water quenching is more increased as the carbon content is more decreased, and is more decreased as the carbon content is more increased. Accordingly, in a case where a stabilizer is produced of a manganese boron steel material having a low carbon content, the stabilizer having a high fatigue strength and a corrosion resistance is produced, even if shot-peening is not executed. Further, as illustrated in FIG. 11B, a tensile residual stress is generated in oil quenching, while a compressive residual stress is generated in water quenching. It is observed that the stress values are sufficiently large (about 300 MPa or higher at maximum) in a range of 20 mm to 30 mm in diameter.

Next, a corrosion resistance of a stabilizer was evaluated, the stabilizer being made of a manganese boron steel material having a low carbon content and being produced through water quenching.

As a sample for a corrosion resistance test, a semi-finished product of the stabilizer (sample 1-1) was provided. The product was made of the sample 1 as a material and was subjected to the forming step S30 and the quenching step S40 for water quenching, without tempering. Further, as a comparison, a semi-finished product of the stabilizer (sample 1-2) was provided. The product was made of the sample 9 which is a conventional spring steel material as a material and was tempered after oil quenching. Note that both diameters were set at 14 mm. The corrosion resistance test was a cycle test (CCTI) for measuring corrosion weight loss. Each sample was masked except a corroded surface in a size of 10 mm diameter×50 mm length. A cycle including a salt spray process (NaCl concentration 5%) for 4 hours at 35° C., a drying process for 2 hours at 60° C. and a wet process for 2 hours at 50° C. and 95% RH was repeated. Note that the corrosion weight loss was calculated by dividing a difference between a pretest weight and a post-test weight by an area of the corroded surface.

Figure 12:
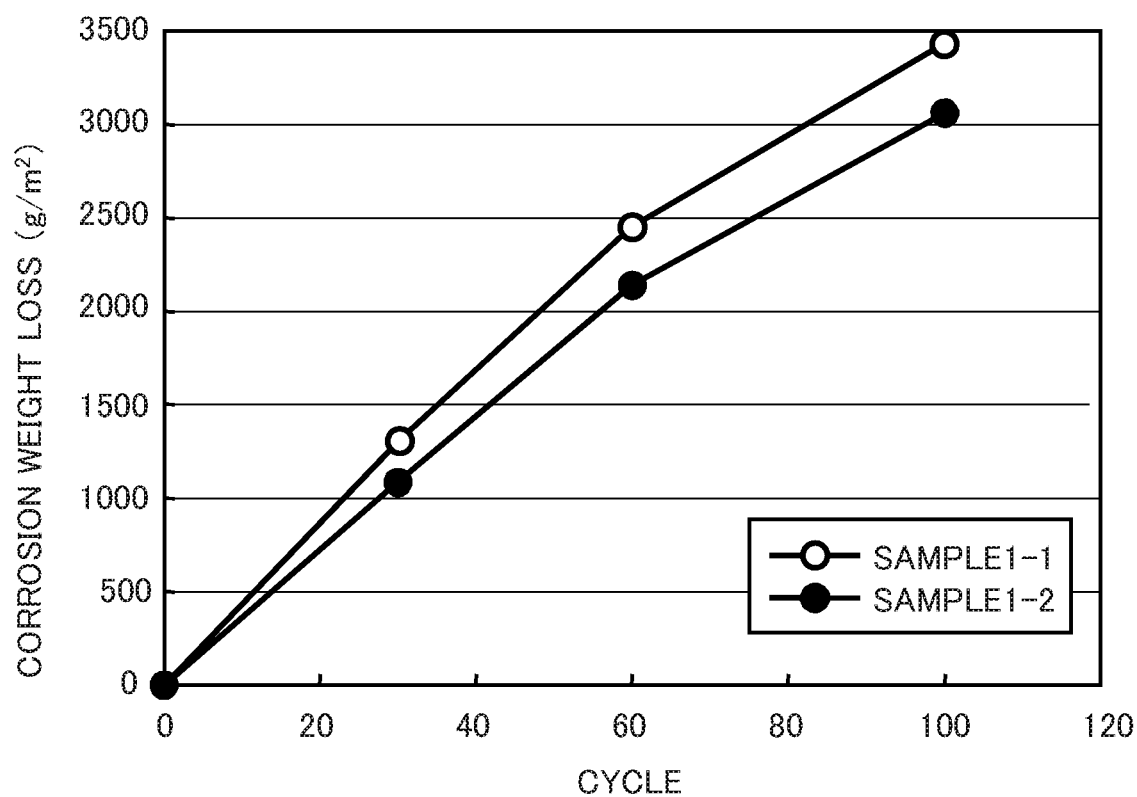
FIG. 12 is a graph illustrating results of an anti-corrosion test.

FIG. 12 is a graph illustrating results of the corrosion resistance test.

As illustrated in FIG. 12, it is observed that the sample 1-2 made of a manganese boron steel material having a low carbon content as a material and being water-quenched has a more improved corrosion resistance than the sample 1-2 made of a conventional spring steel material and being tempered after oil quenching. In the sample 1-2, since troostite or sorbite is formed by tempering, it is observed that the corrosion rate thereof is faster than that of the sample 1-1 having a martensitic texture with a low carbon content.

Then, fatigue cracking progress of a stabilizer was evaluated, the stabilizer being made of a manganese boron steel material having a low carbon content and being produced through water quenching.

As a sample for a fracture toughness test, a semi-finished product of the stabilizer (sample 2-1) and a semi-finished product of the stabilizer (sample 2-2) were provided. The product (sample 2-1) was made of the sample 9 which is a conventional spring steel material as a material and was tempered after oil quenching. The product (sample 2-2) was made of the sample 1 as a material and was subjected to the forming step S30 and the quenching step S40 for water quenching, without tempering. Note that a hardness of the sample 2-1 was set at 42.7 (HRC), and a hardness of the sample 2-2 was set at 45.8 (HRC).

Figure 13:
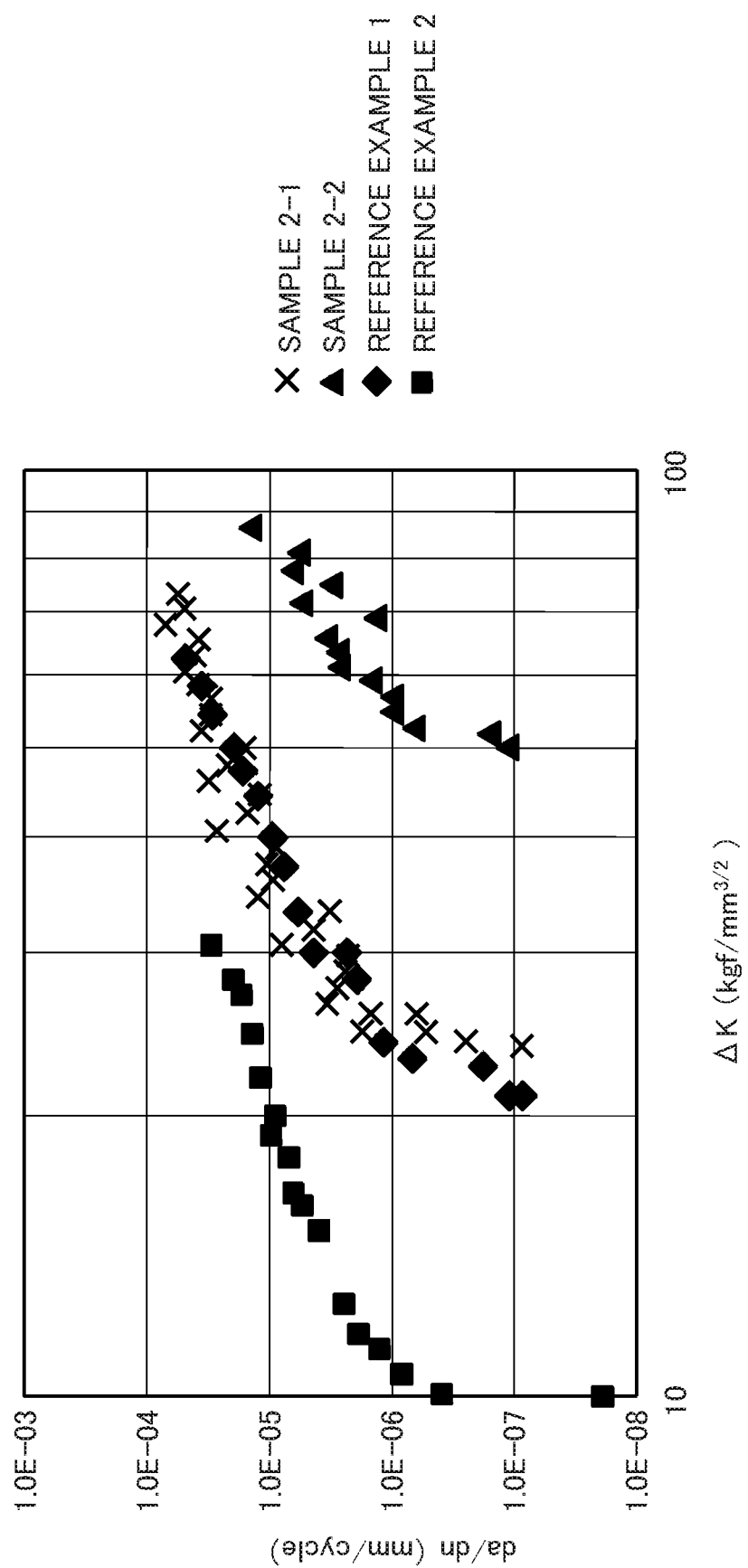
FIG. 13 is a graph illustrating analyzed results of evolution of fatigue cracking.

FIG. 13 is a graph illustrating analyzed results of fatigue cracking progress.

In FIG. 13, the vertical axis indicates a fatigue cracking propagation rate da/dN (mm/cycle), and the horizontal axis indicates a stress intensity factor range $\Delta K$ (Kgf/Mm$^{3/2}$). The plot by X indicates the sample 2-1, the plot by ▲ indicates the sample 2-2, the plot by ◆ indicates a reference example 1 (previously reported value of SUP7 (HRC46.5)), and the plot by ■ indicates a reference example 2 (previously reported value of SUP7 (HRC61.0)).

As illustrated in FIG. 13, the fatigue cracking propagation rate of the sample 2-2 is about 1/10 to 1/100 of the sample 2-1, which indicates a better fracture toughness than that of the reference examples 1 and 2 made of a conventional spring steel material. Further, it was observed that a fracture toughness value (Kc) of the sample 2-2 has reached about 1.6 times as the sample 2-1 and a fatigue resistance was also increased when the Kc was calculated.

Other Embodiments

1. In the above embodiment, the water-based cooling agent having a heat transfer coefficient higher than or close to that of water is exemplified, but any medium may be used only if it can rapidly cool down a target to be quenched to give predetermined properties such as the mechanical strength and the fracture toughness described above to the stabilizer 1. For example, ice, an organic solvent, water or oil including a liquid or a solid having a large heat transfer coefficient may be used. Note that the medium may be a liquid or a liquid containing a solid, and its phase is not particularly limited. Shortly, depending on the required properties of the stabilizer 1, a stabilizer may be produced through the forming step in which the steel bar material containing at least C: 0.15 wt % to 0.39 wt %, Mn, B and Fe is bent into a product shape and through the quenching step in which the bent steel bar is quenched at a lower critical cooling rate or above after austenitizing, without tempering the quenched steel bar.

2. In the above embodiment, the steel bar material is exemplified which contains, as a raw material for the stabilizer 1, C: 0.15% to 0.39%, Si: 0.05% to 0.40%, Mn: 0.50% to 1.70%, B: 0.0005% to 0.003% in wt % as essential elements and P: 0.040% or lower and S: 0.040% or lower, and may contain at least one element selected from a group consisting of Ni, Cr, Cu, Mo, V, Ti, Nb, Al, N, Ca and Pb as an optional additive element in a range of 1.20% or lower, and contains a remainder containing Fe and inevitably included impurity elements. A steel bar material at least containing C: 0.15 wt % to 0.39 wt %, Mn, B, and Fe may be used as a raw material for the stabilizer 1 if the material gives the stabilizer 1 given properties such as mechanical strength and fracture toughness described above. Alternatively, a steel bar material may be used, at least containing C: 0.15% to 0.39%, Mn: 0.50% to 1.70%, B: 0.0005% to 0.003% and Fe in wt %.

3. In the above embodiment, the solid stabilizer 1 is exemplified, but the invention may be applied to a hollow stabilizer in a pipe shape.

4. In the embodiment, various configurations are described, but each configuration may be selected or each configuration may be properly combined.

5. The above embodiment describes an example of the invention. The invention may be modified variously in a range described in claims or the embodiment.

DESCRIPTION OF REFERENCE NUMERALS 1 stabilizer
1a torsion portion
1b arm portion
1c bent portion
2 stabilizer link
3 suspension
3a axle
4 bushing
S10 machining step
S20 heating step
S30 forming step
S40 quenching step
S50 shot-peening step
S60 precoating treatment step
S70 preheating step
S80 coating step
S90 post-heating step

The invention claimed is:

1. A production method for stabilizers, the method comprising:
    forming a steel bar material into a product shape by bending, the steel bar material being a manganese boron steel containing at least C: more than 0.20 wt % to 0.39 wt %, Mn: 0.50 wt % to 1.70 wt %, B: 0.0005 wt % to less than 0.001 wt %, and Si: 0.05 wt % to 0.40 wt % as essential elements, the steel bar material further comprises P: 0.040% or lower and S: 0.040% or lower as inevitably included impurity elements; at least one element selected from a group consisting of Ni: 0.30% or lower, Cr: 1.20% or lower, Cu: 0.30% or lower, Mo: 0.08% or lower, V: 0.30% or lower, Ti: 0.05% or lower, Nb: 0.06% or lower, Al: 0.30% or lower, N: 0.02% or lower, Ca: 0.40% or lower, and Pb: 0.40% or lower as optional additive elements; and a remainder containing Fe and other inevitably included impurity elements;
    heating the bent steel bar material at a temperature between 850° C. and 1100° C. for austenitizing;
    quenching the bent steel bar material in a medium having a heat transfer coefficient higher than or close to that of water, the quenching of the heated bent steel bar material being performed at a critical cooling rate or above in a medium of water, water solution with polymer, or salt water having a heat transfer coefficient higher than or close to that of water;

preheating the quenched steel bar material that is not shot-peened in a range of 180° C. to 200° C.;

coating the preheated steel bar material with a coating material, the coating material including an epoxy resin powder; and post-heating the coated coating material at a temperature in a range of 180° C. to 200° C., wherein the stabilizer to be produced includes a metal texture of which 90% or higher is formed of a quench-induced martensite texture, and wherein a stabilizer is produced of the quenched steel bar material without being tempered.

2. The production method for stabilizers according to claim 1 further comprising:

shot-peening a surface of the quenched steel bar material;

preheating the steel bar material shot-peened;

performing the coating of the preheated steel bar material with the coating material; and performing the post-heating of the coated coating material.

3. The production method for stabilizers according to claim 2, wherein a heating temperature in the preheating and post-heating is in a range of 180° C. to 200° C.

4. The production method for stabilizers according to claim 1, wherein the stabilizer to be produced has a compressive residual stress of 150 MPa or higher up to 0.8 mm in depth from a surface of the steel bar material.

5. The production method for stabilizers according to claim 1, wherein the stabilizer to be produced at a room temperature has a Rockwell hardness (HRC) over 44.5 and a Charpy impact value 30 J/cm2 or higher.

6. The production method for stabilizers according to claim 1, wherein the steel bar is equivalent to a steel defined as 15B23 or 15B26 in Standard American Engineering.

* * * * *